(12) United States Patent
Ibe

(10) Patent No.: US 10,909,648 B2
(45) Date of Patent: Feb. 2, 2021

(54) DELIVERY SYSTEM

(71) Applicant: V-Sync Co., Ltd., Tokyo (JP)

(72) Inventor: Takaya Ibe, Tokyo (JP)

(73) Assignee: V-Sync Co., Ltd., Tokyo (JP)

( * ) Notice: Subject to any disclaimer, the term of this patent is extended or adjusted under 35 U.S.C. 154(b) by 362 days.

(21) Appl. No.: 15/576,732

(22) PCT Filed: Jan. 30, 2017

(86) PCT No.: PCT/JP2017/003156
§ 371 (c)(1),
(2) Date: Nov. 24, 2017

(87) PCT Pub. No.: WO2017/141679
PCT Pub. Date: Aug. 24, 2017

(65) Prior Publication Data
US 2018/0165782 A1 Jun. 14, 2018

(30) Foreign Application Priority Data

Feb. 15, 2016 (JP) ................................. 2016-026100
Feb. 15, 2016 (JP) ................................. 2016-026101
(Continued)

(51) Int. Cl.
*G06Q 50/28* (2012.01)
*B65G 61/00* (2006.01)
(Continued)

(52) U.S. Cl.
CPC .............. *G06Q 50/28* (2013.01); *B65G 61/00* (2013.01); *G06Q 10/08355* (2013.01);
(Continued)

(58) Field of Classification Search
CPC .. G06Q 50/28; G06Q 10/08355; B65G 61/00; A47G 29/141; A47G 2029/144; A47G 2029/149
See application file for complete search history.

(56) References Cited

U.S. PATENT DOCUMENTS 6,213,025 B1 4/2001 Sauerwein et al.
9,798,995 B1 * 10/2017 Soundararajan ... G06Q 10/0833
(Continued)

FOREIGN PATENT DOCUMENTS

| CN | 103057883 A | 4/2013 |
| CN | 104150178 A | 11/2014 |

(Continued)

OTHER PUBLICATIONS

Bekhti, Path planning of unmanned aerial vehicles with terrestrial wireless network tracking, 2016, 1-3 (Year: 2013).*
(Continued)

*Primary Examiner* — Kevin H Flynn
*Assistant Examiner* — Ibrahim N El-Bathy
(74) *Attorney, Agent, or Firm* — Studebaker & Brackett PC

(57) ABSTRACT

A delivery system comprises a delivery vehicle configured to carry a delivery box to be delivered to a delivery destination thereon; and a carrier vehicle configured to carry the delivery vehicle thereon. The carrier vehicle performs exit control to get the delivery car carrying the delivery box to be delivered to the delivery destination out of the carrier vehicle at a relay point on a traveling route to the delivery destination, and the delivery vehicle performs traveling control on the traveling route from the relay point to the delivery destination, and fixes the delivery box to a delivery box fixture located at the delivery destination.

5 Claims, 16 Drawing Sheets

(30) Foreign Application Priority Data

Feb. 15, 2016 (JP) ................................ 2016-026102
Feb. 15, 2016 (JP) ................................ 2016-026103
Feb. 15, 2016 (JP) ................................ 2016-026104

(51) Int. Cl.
*G06Q 10/08* (2012.01)
*A47G 29/14* (2006.01)

(52) U.S. Cl.
CPC ...... *A47G 29/141* (2013.01); *A47G 2029/144* (2013.01); *A47G 2029/149* (2013.01)

(56) References Cited

U.S. PATENT DOCUMENTS

| | | | |
|---|---|---|---|
| 2002/0040564 A1* | 4/2002 | Killingbeck | F25D 3/06 53/416 |
| 2014/0081445 A1 | 3/2014 | Villamar | |
| 2014/0254896 A1 | 9/2014 | Zhou et al. | |
| 2015/0006005 A1 | 1/2015 | Yu et al. | |
| 2015/0120094 A1* | 4/2015 | Kimchi | B64C 39/024 701/3 |
| 2015/0158599 A1* | 6/2015 | Sisko | A47G 29/141 244/114 R |
| 2015/0349917 A1 | 12/2015 | Skaaksrud | |
| 2016/0200438 A1* | 7/2016 | Bokeno | B64C 39/024 |

FOREIGN PATENT DOCUMENTS

| | | |
|---|---|---|
| CN | 204453507 U | 7/2015 |
| DE | 19626966 A1 | 1/1998 |
| ES | 1 135 980 U | 2/2015 |
| GB | 2 365 607 A | 2/2002 |
| JP | H6-305353 A | 11/1994 |
| JP | H07-006197 U | 1/1995 |
| JP | H07-315111 A | 12/1995 |
| JP | 2002-133577 A | 5/2002 |
| JP | 2002-205824 A | 7/2002 |
| JP | 2004-315116 A | 11/2004 |
| JP | 2004-323203 A | 11/2004 |
| JP | 2005-126206 A | 5/2005 |
| JP | 2015-036164 A | 2/2015 |
| WO | 01/31487 A2 | 5/2001 |
| WO | 02/17246 A2 | 2/2002 |
| WO | 2014/080389 A2 | 5/2014 |
| WO | 2016/022646 A1 | 2/2016 |

OTHER PUBLICATIONS

An Office Action; "Notification of Reasons for Refusal," issued by the Japanese Patent Office dated Nov. 20, 2018, which corresponds to Japanese Patent Application No. 2016-026101 and is related to U.S. Appl. No. 15/576,732; with English Translation.
The extended European search report issued by the European Patent Office dated Aug. 16, 2018, which corresponds to European Patent Application No. 17752942.7-1222 and is related to U.S. Appl. No. 15/576,732.
TechnoKontrol: "Smart Delivery Box", Internet Article, Sep. 7, 2015, XP055497067, Retrieved from the Internet: URL:https://web.archive.org/web/20150907115852/https://technokontrol.com/en/products/smart-delivery-box.php [retrieved on Aug. 2, 2018], 37 pages.
Erik Sofge: "The Dream of Delivery Drones is Alive (and on a Truck)", Internet Article (Popular Science), Feb. 18, 2015, XP055497164, Retrieved from the Internet: URL:https://www.popsci.com/dream-delivery-drones-alive-and-truck [retrieved on Aug. 3, 2018], 12 pages.
Wikipedia: "Intermodal container", Internet Article, Jan. 29, 2016, XP055497213, Retrieved from the Internet: URL:https://en.wikipedia.org/w/index.php?title=Intermodal_container&oldid=702246687 [retrieved on Aug. 3, 2018], 13 pages.
Wikipedia: "Twistlock", Internet Article, Feb. 5, 2016, XP055497218, Retrieved from the Internet: URL: https://en.wikipedia.org/w/index.php?title=Twistlock&oldid=703432583 [retrieved on Aug. 3, 2018], 4 page.
An Office Action; "Notification of Reasons for Refusal," issued by the Japanese Patent Office dated Mar. 5, 2019, which corresponds to Japanese Patent Application No. 2016-026101 and is related to U.S. Appl. No. 15/576,732; with English language translation.
International Search Report issued in PCT/JP2017/003156; dated Apr. 11, 2017.
Robinette; HorseFly 'Octocopter' Primed to Fly the Future to Your Front Door; University of Cincinnati; [online]; Apr. 6, 2014; [retrieved on Mar. 28, 2017]; Retrieved from the Internet: <URL:http://www.uc.edu/news/nr.aspx?id=19929>.
An Office Action mailed by the Japanese Patent Office dated Sep. 24, 2019, which corresponds to Japanese Patent Application No. 2018-235563 and is related to U.S. Appl. No. 15/576,732; with English language translation.
A Notification of the First Office Action issued by the National Intellectual Property Administration, PRC dated Jan. 21, 2019, which corresponds to Chinese Patent Application No. 201780001714.6 and is related to U.S. Appl. No. 15/576,732.
Communication pursuant to Article 94(3) EPC issued by the European Patent Office dated Apr. 9, 2020, which corresponds to European Patent Application No. 17 752 942.7-1222 and is related to U.S. Appl. No. 15/576,732.

* cited by examiner

CONTENTS OF E-MAIL

TO : xxx@yyy.jp
FROM: SENDER

SUBJECT: COMPLETION OF DELIVERY

MESSAGE:
 YOUR ORDERED ITEM (ORDER NUMBER 00000)
 DATED MM DD, 2016 HAS BEEN DELIVERED.

PLEASE RECEIVE YOUR PARCEL
 BY MM DD, 2016

BOX NUMBER: 120

UNLOCKING PASS WORD: pass_abc

*FIG. 13*

DELIVERY SYSTEM

TECHNICAL FIELD

The present invention relates to a delivery system.

BACKGROUND ART

As an environment for communication by using various kinds of terminals has been improved in the whole of society, e-commerce (electric commerce) by using EC (e-commerce) sites created by using web technology has been widely used.

These EC sites are also referred to as, for example, online shops, which serve as virtual shops on the Web. When a person selects an item in an EC site, the person can purchase the item, and then a set of procedures including personal identification, payment, and so forth are completed on a web payment system. After that, the purchased item is delivered to a designated delivery destination.

Items offered by the EC sites include, for example, "digital data" delivered online, and "tangible products or goods" such as commodities. When "digital data" is purchased, the purchased item is sent to a designated address such as an e-mail address, so that the delivery of the item is completed. Meanwhile, when "tangible product" is purchased, the item is delivered to a delivery destination via, for example, a delivery company in general. That is, a delivery process is required to deliver the purchased item to the delivery destination.

When a delivery company is used for the delivery, the delivery process is naturally performed by humans, and therefore involves costs such as a labor cost. Consequently, when an amount of delivered parcels (items) are increased, the costs for labor and equipment are increased. Moreover, when the recipient of the parcel (item) is absent at the delivery destination, it is necessary to perform additional procedures such as creating a delivery absence, and requesting redelivery.

As described above, while the e-commerce through EC sites has been widely used, it takes a lot of labor to deliver the purchased items or products, and therefore the delivery costs are increased.

CITATION LIST

Patent Literature

PTL1: Japanese Patent Application Laid-Open No. 2004-315116

SUMMARY OF INVENTION

Technical Problem

The above-described patent literature 1 discloses a technology for delivering an item by: registering image data of at least the address and name of a sender and the address and name of a recipient shown in an application form, as part of delivery information, in a shipping control database: printing shipping data as a shipping label based on the image data; attaching the shipping label to the item; and referring to the shipping information by using an invoice number printed on the shipping label as a key of the delivery control database.

However, this patent literature 1 merely discloses a technique for improving working efficiency of the delivery.

It is therefore an object of the present invention to provide a delivery system that can efficiently deliver parcels.

Solution to Problem

In order to achieve the above-described object, the invention recited in claim 1 is a delivery system comprising: a delivery vehicle configured to carry a delivery box to be delivered to a delivery destination thereon; and a carrier vehicle configured to carry the delivery vehicle thereon, wherein: the carrier vehicle performs exit control to get the delivery car carrying the delivery box to be delivered to the delivery destination out of the carrier vehicle at a relay point on a traveling route to the delivery destination; and the delivery vehicle performs traveling control on the traveling route from the relay point to the delivery destination, and fixes the delivery box to a delivery box fixture located at the delivery destination.

The invention recited in claim 5 is A delivery system for delivering a delivery box to a delivery destination, comprising: a delivery vehicle configured to carry the delivery box to be delivered to the delivery destination thereon; and a carrier vehicle configured to carry the delivery vehicle thereon, wherein: a delivery box fixture configured to be able to fix the delivery box is located at the delivery destination; the delivery box is carried on the delivery vehicle at a predetermined position; the delivery vehicle includes a movable member configured to move the delivery box from the predetermined position to the delivery box fixture; and the delivery vehicle fixes the delivery box to the delivery box fixture located at the delivery destination by using the movable member, after the delivery vehicle gets out of the carrier vehicle and travels to the delivery destination.

According to the present invention, it is possible to efficiently deliver parcels.

BRIEF DESCRIPTION OF DRAWINGS

FIG. 13 is a drawing showing contents of an e-mail sent to the recipient of a parcel;

DESCRIPTION OF EMBODIMENTS

Hereinafter, an embodiment of the delivery system according to the present invention will be described in detail with reference to the accompanying drawings.

Embodiment

Figure 1:
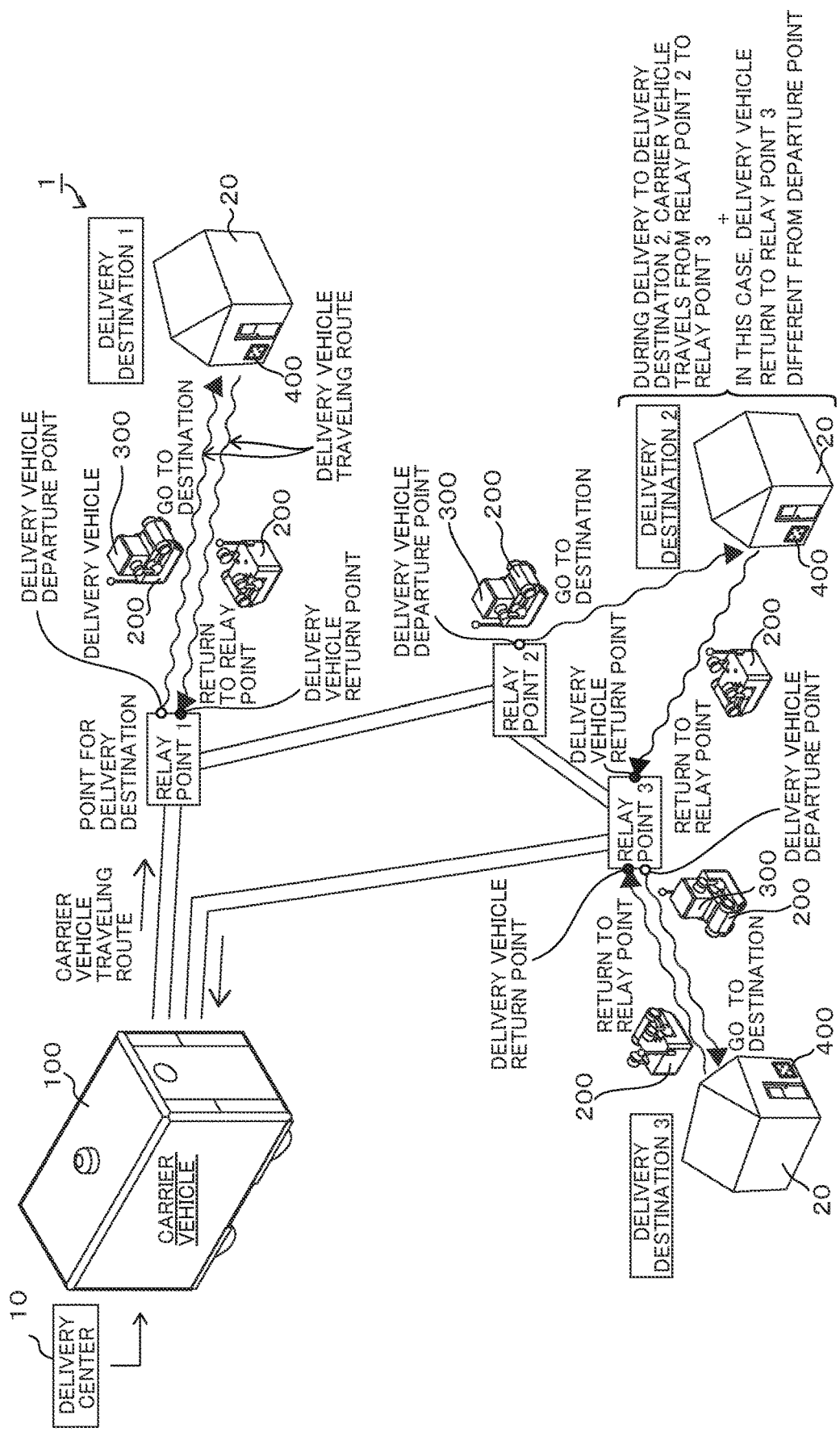
FIG. 1 is a drawing showing the outline of a delivery system according to an embodiment of the present invention.

FIG. 1 is a drawing showing the outline of the delivery system according to an embodiment of the present invention.

The delivery system shown in FIG. 1 is configured to deliver parcels by moving a vehicle for delivery from a delivery center (hereinafter referred to as "center 10") as a shipping place to a delivery destination 20.

The center 10 is a generic term for a merchandise management center for managing items, a shipping center for performing a shipping procedure to ship the item ordered by a purchaser among items managed in the merchandise management center, and a monitoring center for monitoring the delivery, and may be referred to as a delivery base.

The center 10 receives orders through EC (electric commerce) sites where e-commerce is enabled. To be more specific, a server provided in the center 10 which controls and manages the EC sites receives the orders.

These EC sites are shops on the Web, which can be accessed by using electronic devices such as a PC and a tablet at home. A person who wants an item can easily order and purchase the item by accessing the EC site, and therefore easily enjoy shopping.

Also the person can access the EC site from an automatic vending machine which is equipped with a liquid crystal display and connected to the website through network communication. For example, the person can purchase the item shown on the liquid crystal display in the same way as purchasing a beverage from a conventional automatic vending machine.

To purchase the item by using the EC site, the person designates a method of payment and a delivery destination 20, as well as the item to be purchased.

At the center 10, upon receiving the order from the purchaser with the delivery destination 20, a delivery process is performed, including selecting the ordered item from among the managed items and delivering the item to the delivery destination 20 by using a vehicle for delivery.

Details of a shipping process performed at the center 10 will be described later, with reference to FIG. 3.

The purchased item is delivered as a parcel from the center 10 to the delivery destination 20 by the vehicle for delivery.

In this case, the parcel is stored in a suitable delivery box 300 (also referred to as "box", or "storage container") which is selected based on its size, shape, quantity and impact resistance. Accordingly, "parcel" and "delivery box" are the same in meaning as a delivered object, and therefore "delivery of the parcel" and "delivery of the delivery box" are not different from one another in meaning.

In addition, the vehicle for delivery includes a small delivery vehicle on which the delivery box 300 is carried, and a large carrier vehicle on which the small delivery vehicle is carried.

The large carrier vehicle can carry one or more small delivery vehicles thereon, and is also referred to as "automated driverless large carrier vehicle", or "carrier vehicle." Hereinafter this large carrier vehicle will be referred to as "carrier vehicle 100", and described in detail with reference to FIG. 4.

On the other hand, the small delivery vehicle which can be carried on the carrier vehicle 100 can carry the delivery box 300 storing the parcel, and is also referred to as "automated driverless small delivery vehicle" or "delivery vehicle." Hereinafter, the small delivery vehicle will be referred to as "delivery vehicle 200", and described in detail with reference to FIG. 5.

From the relationship as described above, it may be explained that the carrier vehicle 100 carries the delivery box 300 thereon because the carrier vehicle 100 carries the delivery vehicle 200 carrying the delivery box 300.

At the center 10, information on the delivery destination 20 (delivery information) of the delivery box 300 storing the parcel as delivery information is set or stored in each of the carrier vehicle 100 and the delivery vehicles 200. That is, the delivery vehicle 200 carrying one delivery box 300 stores the information on the delivery destination 20 of the delivery box 300, while the carrier vehicle 100 stores the information on the delivery destination 20 for each of the delivery boxes 300.

The delivery information includes the address and name of the delivery destination 20, "fixture number" for identifying a delivery box fixture 400, and "box identification information" for identifying the delivery box 300 to be delivered.

The carrier vehicle 100 includes an automated driving control mechanism (automated driving control part) and a delivery control mechanism (delivery control part). The automated driving mechanism and the delivery control mechanism work together to deliver parcels.

The automated driving control (traveling control) mechanism is a generic term for devices required to move the carrier vehicle 100 to a predetermined position or point, which includes a driving control device, a storage device, an engine, a drive wheel, various kinds of actuators, a motor such as a servomotor and an inwheel motor, a cylinder, various kinds of sensors such as a camera (imaging device).

The storage device stores map information used to determine a delivery route to the delivery destination 20, and road information on a road which is a traveling path or delivery path of the carrier vehicle 100, as well as the information on the delivery destination 20. In addition, the storage device also can store traffic information updated as needed.

Naturally, the driving control device can drive (move and stop) the carrier vehicle 100. Moreover, the driving control device can translate the carrier vehicle 100 not only back and forth, but also side to side, or in an oblique direction, and rotate the carrier vehicle 100 on the spot, in order for parallel park or change in direction of the carrier vehicle 100 in a narrow place such as a narrow alley.

This driving control device also includes a GPS (global positioning system) device that can specify a position, or position a point on the map information.

The driving control device searches a delivery route (traveling route) from the current location to the delivery destination 20 by using the GPS device and various information such as map information, road information and traffic information stored in the storage device, and stores the searched delivery route, and then drives or moves the carrier vehicle 100 based on the delivery route. Naturally, it is possible to update or change the delivery route as needed, based on additional traffic information and road information.

The carrier vehicle 100 comprehensively realizes other cars around itself, pedestrians, animals, a falling object, grooves, bumps, driving lanes defined by center lines, and traffic lights, based on information obtained by a radar, a sensor, such as a laser sensor, an infrared sensor, an ultrasonic sensor, and a pyroelectric sensor, and in addition, a facial recognition system with a camera, and a human body detection system. By this means, the carrier vehicle 100 can safely drive or travel to the delivery destination 20 or a location near the delivery destination 20, avoiding various risks on the road.

Moreover, after the carrier vehicle 100 travels on the delivery route ("first traveling path") from the center 10 as the shipping place to a predetermined position or point (hereinafter referred to as "exit point" and "relay point") by the automated driving control mechanism, the delivery control mechanism performs exit control to get the delivery vehicle 200 out of the carrier vehicle 100. In this exit control, the delivery control mechanism specifies the delivery vehicle 200 carrying the delivery box 300 to be delivered to the delivery destination 20 via a predetermined position such as the exit point or the relay point on the delivery route, and opens a door of the carrier vehicle 100 to get the delivery vehicle 200 out of the carrier vehicle 100 via the door serving as an exit pathway.

That is, the carrier vehicle 100 carrying the delivery vehicles 200 thereon travels on the first traveling path from the center 10 as the shipping place to the predetermined position or point such as the exit point or the relay point on the delivery route. In other words, the delivery vehicles 200 are carried on and moved together with the carrier vehicle 100 on the first traveling path from the delivery destination to the relay point.

Moreover, after the delivery vehicle 200 delivers the delivery box 300 to the delivery destination 20 and returns to the carrier vehicle 100, the delivery control mechanism performs entrance control to let the delivery vehicle 200 into the carrier vehicle 100. To be more specific, after the delivery vehicle 200 returns to a predetermined position which is designated with respect to the carrier vehicle 100 to enter the carrier vehicle 100, in mutually communication with the carrier vehicle 100, the delivery control mechanism performs the entrance control to open the door of the carrier vehicle 100, to let the delivery vehicle 200 into the carrier vehicle 100 via the door as an entrance path, and to stop the delivery vehicle 200 at a predetermined stop position in the carrier vehicle 100.

In addition, the delivery control mechanism manages the delivery condition of the delivery vehicle 200 by the mutual communication between the carrier vehicle 100 and the delivery vehicle 200 having gotten out of the carrier vehicle 100.

Moreover, the carrier vehicle 100 includes a monitoring camera that can monitor the surrounding of the carrier vehicle 100, a microphone and a speaker at its predetermined portions. When an emergency or a trouble occurs in the carrier vehicle 100, maintenance and monitoring staff at the center 10, in particular, a monitoring center in mutual communication with the carrier vehicle 100 can check the situation around the carrier vehicle 100 by the monitoring camera of the carrier vehicle 100 and talk with persons around the carrier vehicle 100. Moreover, the maintenance and monitoring staff can operate to drive the carrier vehicle 100 by remote control, checking the situation around the carrier vehicle 100 by using a camera.

Meanwhile, like the carrier vehicle 100, the delivery vehicle 200 also includes the automated driving control mechanism (automated driving control part), and the delivery control mechanism (delivery control part), and the automated driving control mechanism and the delivery control mechanism work together to deliver parcels. Here, the automated driving control mechanism of the delivery vehicle 200 is similar to, but different from that of the carrier vehicle 100, and also the delivery control mechanism of the delivery vehicle 200 is different from that of the carrier vehicle 100.

The automated driving control (traveling control) mechanism of the delivery vehicle 200 is a generic term for devices required to move the delivery vehicle 200 from the point at which the delivery vehicle 200 gets out of the carrier vehicle 100 (hereinafter referred to as "exit point" or "relay point") to the delivery destination 20, and includes a driving control device, a storage device, an engine, a drive wheel, various kinds of actuators, a motor such as a servomotor and an inwheel motor, a cylinder, various kinds of sensors such as a camera (imaging device).

The automated driving control mechanism allows the delivery vehicle 200 to travel on the delivery route (a second traveling path) from the point at which the delivery vehicle 200 gets out of the carrier vehicle 100 such as the exit point or the relay point to the delivery destination 20.

That is, the delivery vehicle 200 travels on the second traveling path from the point at which the delivery vehicle 200 gets out of the carrier vehicle 100, such as the exit point or the relay point to the delivery destination 20. In other word, the delivery vehicle 200 travels, independently of the carrier vehicle 100, on the second traveling path from the relay point to the delivery destination 20.

The storage device of the delivery vehicle 200 stores information on the delivery destination 20, map information used to determine the delivery route to the delivery destination 20, and road information on the road as a traveling path or delivery path of the delivery vehicle 200. In addition, the storage device can also store traffic information that can be updated as needed.

Moreover, the driving control device of the delivery vehicle 200 can translate the delivery vehicle 200 not only back and forth, but also side to side, or in an oblique direction, and rotate the delivery vehicle 200 on the spot, in order for parallel park or change in direction of the delivery vehicle 200 in a narrow place such as a narrow alley, and has a balance control function to prevent the delivery vehicle 200 from overturning when the delivery vehicle 200 goes up and down stairs or a slope. This balance control function detects the position of the center of gravity of the delivery vehicle 200 carrying the delivery box 300 point by point, and automatically adjusts the position of the center of gravity by using a centrobaric adjusting device or balancer.

This balance control function prevents the delivery vehicle 200 from overturning or falling due to collision or contact with obstacle.

In addition, the driving control device also includes a GPS device that can specify a position, or position a point on the map information.

The driving control device of the delivery vehicle 200 searches the delivery route or traveling route from the current location to the delivery destination 20 which is specified by the GPS device by using various information such as the map information, the road information and the traffic information stored in the storage device, and stores the searched delivery route, so that delivery vehicle 200 can drive or travel based on the delivery route. Naturally, this delivery route can be updated as needed, based on additional traffic information and road information.

Like the carrier vehicle 100, the delivery vehicle 200 also comprehensively realizes other cars around itself, pedestrians, animals, a falling object, grooves, bumps, driving lanes defined by center lines, and traffic lights, based on information obtained by a radar or a sensor, such as a laser sensor, an infrared sensor, an ultrasonic sensor, and a pyroelectric sensor, a facial recognition system with a camera, and a human body detection system. By this means, the delivery vehicle 200 can safely drive or travel to the delivery destination 20 or a location near the delivery destination 20, avoiding various risks on the road.

Moreover, the delivery vehicle 200 includes a robot arm (also simply referred to as "arm") as the delivery control mechanism. This arm holds the delivery box 300 to prevent the delivery box 300 from dropping out or from being stolen during the delivery. Then, the arm moves the delivery box 300 and checks the position of the delivery box fixture 400 provided at the delivery destination 20 by using, for example, various sensors, an optical device or an electromagnetic sensor, and fixes the delivery box 300 to the delivery box fixture 400. Consequently, the delivery box 300 is delivered.

The relationship between the delivery box 300 and the delivery box fixture 400 will be described later.

As seen from the above, the arm is a member that can grasp, grip or hold the delivery box 300, and may be referred to as "grasp member", "grip member" or "holding member". In addition, the arm can move the delivery box 300, and therefore be referred to as "movable member."

Here, a configuration has been shown where the delivery box 300 is carried on the delivery vehicle 200 in advance. However, this is by no means limiting, but another configuration is possible where the arm moves to carry the delivery box 300 from a predetermined position in the carrier vehicle 100 onto the delivery vehicle 200.

Moreover, the delivery vehicle 200 also includes a monitoring camera that can monitor the surrounding of the delivery vehicle 200, a microphone, a speaker and an emergency stop button at its predetermined portions. When an emergency or a trouble occurs in the delivery vehicle 200, maintenance and monitoring staff at the center 10, in particular, a monitoring center in mutual communication with the delivery vehicle 200 can check the situation around the delivery vehicle 200 by the monitoring camera of the delivery vehicle 200 and talk with persons around the delivery vehicle 200. Moreover, the maintenance and monitoring staff can operate to drive the delivery vehicle 200 by remote control, checking the situation around the delivery vehicle 200 by using a camera.

Moreover, when a person around the delivery vehicle 200 feels danger, the person pushes or touches the emergency stop button, so that it is possible to stop the delivery vehicle 200 moving. Then, as described above, it is possible to check the situation around the delivery vehicle 200 by the monitoring camera of the delivery vehicle 200 and talk with persons around the delivery vehicle 200.

Next, the flow of a process for delivering the delivery box 300 from the center 10 as the shipping place to the delivery destination 20 by the carrier vehicle 100 and the delivery vehicle 200 having the above-described functions will be described.

The carrier vehicle 100 carrying the delivery vehicle 200 searches the delivery route or traveling route to deliver the delivery box 300 carried on the delivery vehicle 200 to the delivery destination 20, based on the information on the delivery destination 20. In this case, the carrier vehicle 100 searches the delivery route to deliver the delivery box 300 to the delivery destination 20 by using the GPS device of the carrier vehicle 100, and the map information and the road information stored in the carrier vehicle 100.

That is, when there is a plurality of delivery boxes 300 to be delivered, or when a plurality of delivery vehicles 200 carrying the delivery boxes 300 are carried on the carrier vehicle 100, delivery routes are searched in consideration of the delivery destination 20 for each of the delivery boxes 300. The carrier vehicle 100 stores the searched delivery routes.

In an example shown in FIG. 1, "delivery destination 1", "delivery destination 2", and "delivery destination 3" are designated as the delivery destinations. In this case, the delivery route is as follows: ""center"→"delivery destination 1"→"delivery destination 2"→"delivery destination 3"→"center"".

Here, although ""center"→"delivery destination 1"" is designated as part of the delivery route, the carrier vehicle 100 travels on the traveling route from the center to a relay point 1 shown as "relay point 1" in FIG. 1, and the delivery vehicle 200 travels from "repay point 1" to "delivery destination 1" to complete the delivery. In this case, "relay point 1" is located for "delivery destination 1", and may be referred to as an exit point at which the delivery vehicle 200 carrying the delivery box 300 to be delivered to the delivery destination gets out of the carrier vehicle 100.

Meanwhile, also the delivery vehicle 200 searches the delivery route or traveling route from the current location, such as the exit point to the delivery destination 20, based on the information on the delivery destination, and searches a return route from the delivery destination 20 to the carrier vehicle 100. In this case, the delivery vehicle 200 searches the delivery route from the current location such as the exit point to the delivery destination 20, and from the delivery destination 20 to the position of the carrier vehicle 100, by using the GPS device of the delivery vehicle 200, and the information such as the map information and the road information stored in the delivery vehicle 200.

When the current location is the point at which the delivery vehicle 200 gets out of the carrier vehicle 100, such as the exit point or the relay point, the delivery vehicle 200 searches the delivery route from this point to the delivery destination 20 and stores the searched delivery route. Then, after the delivery to the delivery destination 20 is completed, the delivery vehicle 200 in mutual communication with the carrier vehicle 100 searches the return route to the return point at which the carrier vehicle 100 is stopped. That is, this example shows a state in which the point at which the delivery vehicle 200 gets out of the carrier vehicle 100 is substantially the same as the return point.

Next, in ""delivery destination 1"→"delivery destination 2"", which is part of the delivery route searched by the carrier vehicle 100, the carrier vehicle 100 travels from "relay point 1" for "delivery destination 1" to "relay point 2" for "delivery destination 2". Similarly, the delivery vehicle 200 searches the delivery route, and delivers the delivery box 300 between "relay point 2" and "delivery destination 2". Here, in FIG. 1, the delivery vehicle 200 having traveled from "relay point 2" to "delivery destination 2" returns not to "relay point 2" at which the delivery vehicle 200 gets out of the carrier vehicle 100 but to "relay point 3" for "delivery destination 3".

That is, FIG. 1 shows a situation where the delivery vehicle 200 returns to the point different from the start point. This indicates that the carrier vehicle 100 travels from "relay point 2" to "relay point 3" for "delivery destination 3" while the delivery vehicle 200 delivers the delivery box 300 to "delivery destination 3" and that the delivery vehicle 200 in communication with the carrier vehicle 100 searches ""delivery destination 2"→"relay point 3"" as the return route.

Moreover, in ""delivery destination 2"→"delivery destination 3"", which is part of the delivery route searched by the carrier vehicle 100, the carrier vehicle 100 travels from "relay point 2" for "delivery destination 2" to "relay point 3" for "delivery destination 3". In this case, the delivery vehicle 200 travels between "relay point 3" to "delivery destination 3" to deliver the delivery box 300.

Then, the carrier vehicle 100 travels ""delivery destination 3"→"center"", which is part of the delivery route searched by the carrier vehicle 100.

The delivery box 300 as a parcel is delivered from the center as the shipping place to the delivery destination 20 through the process as described above.

In this case, a fixture to which the delivery box 300 is fixed (hereinafter referred to as "delivery box fixture 400") is provided at the delivery destination 20.

The delivery box 300 fixed to the delivery box fixture 400 has one or more protrusions (also referred to as "protruding part") 310 which can fix the delivery box 300 to the delivery box fixture 400. The delivery box fixture 400 has one or more slots 410 into or through which the protrusions 310 are inserted to lock the delivery box 300. The protrusion 310 is composed of a cylindrical portion and a conical portion and has a constricted portion between the cylindrical portion and the conical portion.

The protrusions 310 of the delivery box 300 and the slots 410 of the delivery box fixture 400 are fixing members that can fix the delivery box 300 to the delivery box fixture 400. In other words, the delivery box 300 and the delivery box fixture 400 engage with one another by the protrusions 310 and the slots 410, and therefore the protrusions 310 are engagement portions of the delivery box 300 (first engagement portions) while the slots 410 are engagement portions of the delivery box fixture 400 (second engagement portions). Accordingly, the second engagement portions engage with the first engagement portions, so that the delivery box 300 is fixed to the delivery box fixture 400.

In addition, the delivery box fixture 400 has a lock mechanism. When the protrusions 310 of the delivery box 300 are inserted into the slots 410, the lock mechanism performs lock control to lock the protrusions 310 in the slots 410, that is, functions as a stopper, so as to prevent the protrusions 310 from dropping out of the slots 410 or to make it difficult to remove the protrusions 310 from the slots 410. By this means, it is possible to prevent the delivery box 300 from removing without permission or from being stolen.

This lock mechanism may be supported by two of four protrusions 310 of the delivery box 300, and the other two protrusions 310 which are cylindrical waistless pins protruding from the delivery box 300 may engage with upper circular portions of the slots 410 of the delivery box fixture 400 to prevent the delivery box 300 from being lifted up.

When the locked delivery box 300 is removed from the delivery box fixture 400, that is, unlocked, the delivery vehicle 200 authorizes a unique ID or password stored in the storage device of the delivery box 300, so that the delivery vehicle 200 performs unlocking operation to unlock the delivery box 300 and release the delivery box 300 from the delivery box fixture 400.

As described above, the delivery box 300 is fixed to the delivery box fixture 400 by the movable arm of the delivery vehicle 200, so that the delivery of the delivery box 300 is completed.

Here, in a case in which the delivery box 300 is delivered to the delivery destination without the delivery box fixture 400, or the delivery vehicle 200 cannot fix the delivery box 300 to the delivery box fixture 400 for any problem, the recipient with the contact information registered in advance can be notified of arrival of the delivery box 300, and receive the delivery box 300 at a predetermined position (standby position) near the delivery destination 20.

However, in a case in which the delivery vehicle 200 cannot fix the delivery box 300 to the delivery box fixture 400, and even though the recipient with the contact information registered in advance is notified of arrival of the delivery box 300, there is no reply because, for example, the recipient is absent, or it is recognized that the recipient cannot receive the delivery box 300 for some reasons by phone, or via e-mail or SNS, the delivery vehicle 200 returns to the carrier vehicle 100 and checks the time when the recipient stays at home to deliver the delivery box 300 again.

Next, a process after the delivery is completed will be described.

After the delivery of the delivery box 300 is completed through the above-described process, the delivery vehicle 200 notifies of the completion of the delivery, the recipient with the contact information such as an e-mail or SNS (social networking service) address which is part of the recipient information of the delivery box 300 stored in the storage device.

In this case, the recipient is notified of information to take the parcel out of the delivery box 300, such as an unlocking key code (also referred to as "unlocking information" or "unlocking password"), as well as the completion of the delivery.

The delivery box 300 includes an information input part such as a touch panel, a button, and a camera (imaging device), and therefore may receive input of the unlocking key code described later. Upon receiving a correct unlocking key code from the information input part, the delivery box 300 performs lock control to unlock or open the door of the delivery box 300. In addition, when the recipient takes the parcel out of the delivery box 300 from the open door and then closes the door, the delivery box 300 performs the lock control to prevent the door of the delivery box 300 from opening or to close the door of the delivery box 300.

When the recipient of the delivery box 300 (in this case, the recipient is the purchaser if the purchaser and the recipient are the same person) inputs predetermined information to the information input part of the delivery box 300, and the delivery box 300 authenticates the predetermined information as a correct key code, the delivery box 300 performs the lock control to make the delivery box 30 unlockable or open. By this means, the recipient can open the door of the delivery box 300 to take the parcel out of the delivery box 300.

Then, when the door of the delivery box 300 closes or is closed by the recipient after the parcel is taken out of the delivery box 300, the door of the delivery box 300 is locked. Here, it is possible to unlock the door as many times as desired by authenticating that the inputted unlocking key code is correct.

It is possible to take the delivered parcel out of the delivery box 300 through the process as described above.

Then, upon detecting the parcel being taken out, and detecting the door being locked, by using a sensor and so forth, the delivery box 300 sends status information to the center 10. In this case, the center 10 sends "inquiry about box pick-up" to inquire whether or not it is possible to pick up the delivery box 300, to the carrier vehicle 100 delivering the parcel to any delivery destination 20.

Upon receiving this inquiry about box pick-up, the carrier vehicle 100 determines whether or not there is the delivery vehicle 200 available to carry the delivery box 300, that is, the delivery vehicle 200 not carrying the delivery box 300, and sends to the center 10 a replay of whether or not it is possible to pick up the delivery box 300.

After that, upon receiving from the center 10 an instruction to pick up the delivery box 300 ("box pick-up instruction" or "pick-up instruction information"), the carrier vehicle 100 searches and stores the route to the delivery destination 20 as "pick-up destination", based on the information on the pick-up destination ("pick-up information" or "pick-up destination information") designated by the box pick-up instruction, and travels on the route to pick up the delivery box 300.

In this case, the pick-up information includes "fixture number" to identify the delivery box fixture 400 and "box identification information" to identify the delivery box 300 to be picked up, as well as the address and name of the pick-up destination.

Moreover, the route for picking up the delivery box 300 is additionally incorporated into the existing delivery route of the delivery box 300. Therefore, the carrier vehicle 100 performs delivery and pick-up of the delivery box 300 through a new delivery route or a delivery and pick-up route. Naturally, another configuration is possible where the pick-up route is searched and stored independently of the existing delivery route, and after the delivery of the delivery box 300 is completed via the delivery route, the delivery box 300 is picked up via the pick-up route. Otherwise, the delivery box 300 may be picked up via the pick-up route before the delivery box 300 is delivered via the delivery route.

Figure 2:
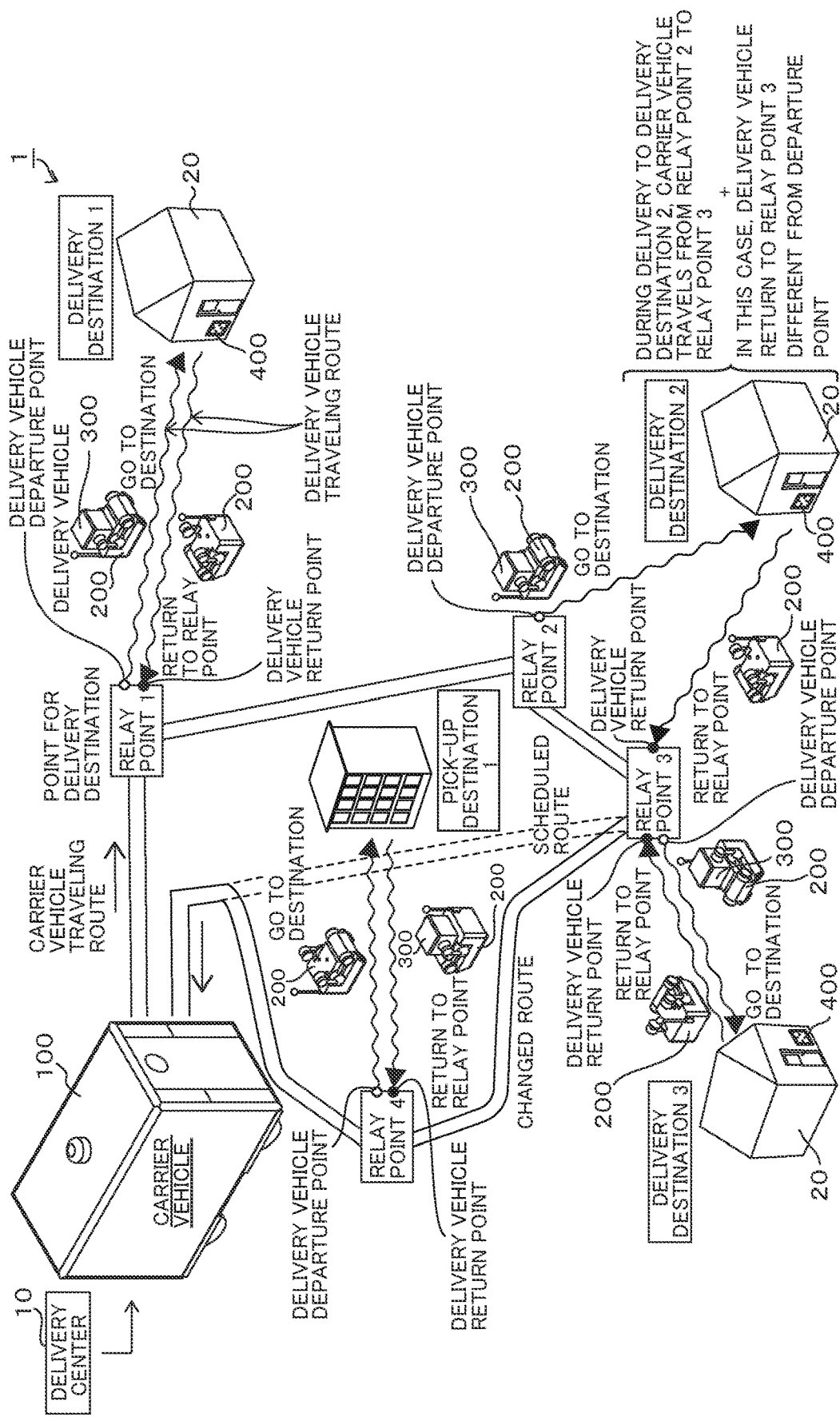
FIG. 2 is a drawing showing the outline of the delivery system according to an embodiment of the present invention.

A configuration in this case is shown in FIG. 2 where the delivery box 300 is delivered and picked up via a new "delivery and pick-up route" made by incorporating the pick-up route of the delivery box 300 into the existing delivery route. This configuration will be described later.

The delivery box 300 delivered to the delivery destination and fixed to the delivery box fixture 400 can be picked up through the above-described process.

FIG. 2 is a drawing showing the outline of the delivery system according to an embodiment of the present invention.

As described above, FIG. 2 shows the delivery system having the delivery and pick-up route made by incorporating the pick-up route of the delivery box 300 into the delivery route of the delivery system as shown in FIG. 1.

The delivery and pick-up route shown in FIG. 2 is made by incorporating "pick-up destination 1" (also referred to as "delivered destination") into the delivery route ""center"→"delivery destination 1"→"delivery destination 2"→"delivery destination 3"→center"" shown in FIG. 1.

To be more specific, the delivery route on which the carrier vehicle 100 travels from "delivery destination 3" to the center 10 is changed to ""delivery destination 3→"pick-up destination 1"→"center"".

Upon receiving "box pick-up instruction" or "pick-up instruction information" from the center 10, the carrier vehicle 100 expected to pick up the delivery box 300 travels to the pick-up destination, based on information on the pick-up destination of the box pick-up instruction or the pick-up instruction information, such as the address of the pick-up destination and information on the box, for example, "box identification information", "unlocking key code" and "size" described later.

Like each of the delivery destination, "relay point 4" as a relay point is provided for "pick-up destination 1", which is a position at which the carrier vehicle 100 stops. The delivery vehicle 200 gets out of the carrier vehicle 100 at "relay point 4", and travels to "pick-up destination 1". In this case, the delivery vehicle 200 moving to the pick-up destination does not carry any delivery box 300 thereon.

At "pick-up destination 1", the delivery vehicle 200 carries the delivery box 300 thereon by using the arm. In this case, the delivery vehicle 200 checks unique delivery box identification information (hereinafter, also referred to as "box ID", or "box identification information") stored in the storage device of the delivery box 300, and an unlocking key code. When the unlocking key code is identical to the box identification information and the unlocking key code as the information on the pick-up destination which is part of "box pick-up instruction" or "pick-up instruction information", the delivery vehicle 200 releases the delivery box 300 from delivery box fixture 400 and carries the delivery box 300 thereon to pick up the delivery box 300.

Through the above-described process, it is possible to complete the delivery even though the recipient does not directly receive the parcel stored in the delivery box 300 at the delivery destination. That is, it is possible to significantly reduce the number of times of redeliveries due to, for example, the absence of the recipient.

Therefore, the delivery system according to the present invention can significantly reduce delivery costs as compared to the conventional delivery.

Figure 3:
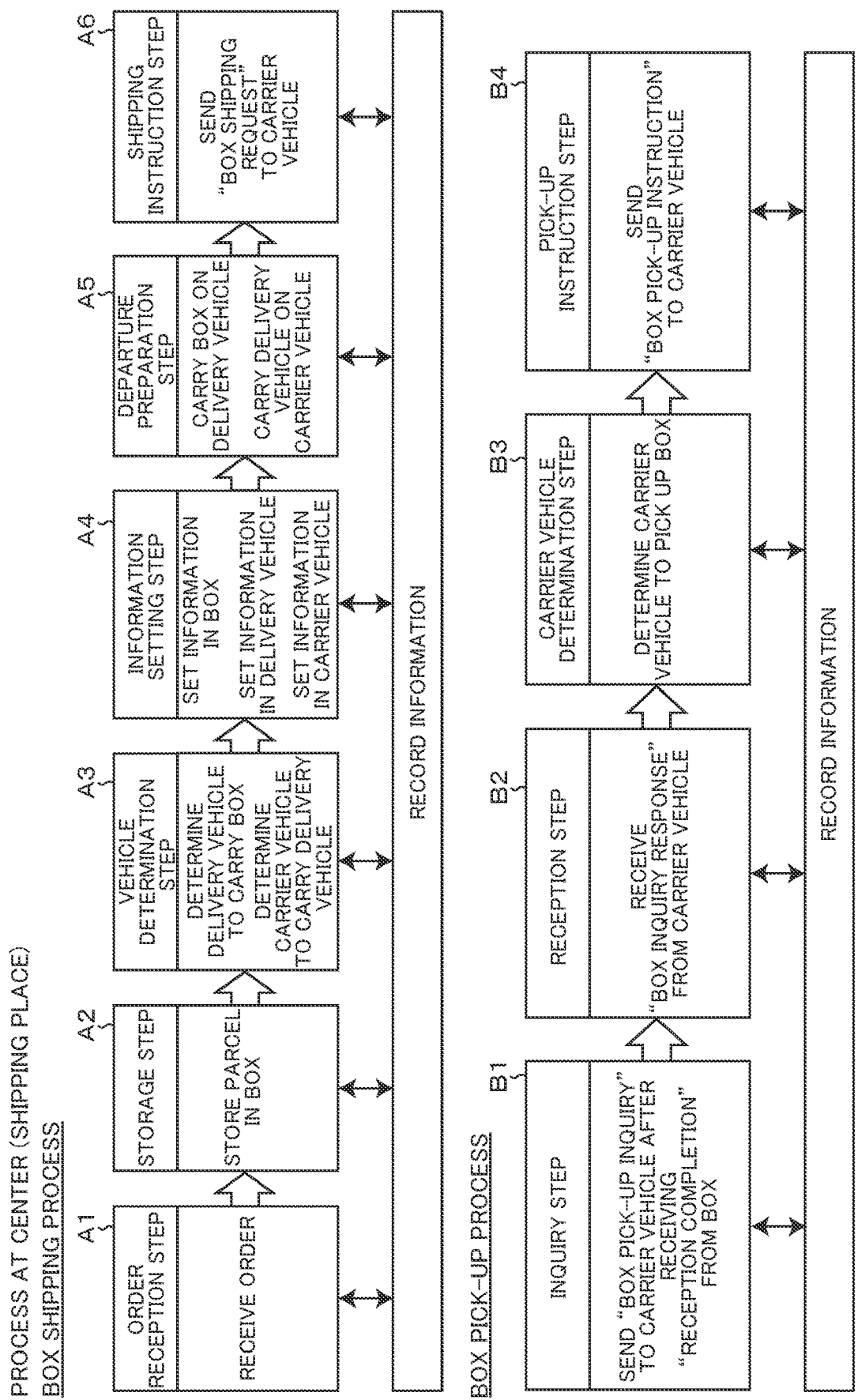
FIG. 3 is a drawing showing an operation process (working process) which is performed in a shipping place constituting the delivery system according to an embodiment of the present invention.

FIG. 3 is a drawing showing an operation process (working process) which is performed in a shipping place constituting the delivery system according to an embodiment of the present invention.

As described above, the center 10 shown in FIG. 3 is a generic term for a merchandise controlling center, a delivery center (shipping place), and a monitoring center. FIG. 3 shows explanation for each of "box shipping process" and "box pick-up process" at the center 10.

First, "box shipping process" for shipping the delivery box 300 to the delivery destination 20 will be described.

In the box shipping process, first "order reception step A1" is performed to receive an order of an item. The order reception step receives the order via an EC site that enables e-commerce.

After the order is received in the order reception step, "storage step A2" is performed to store the ordered item in the delivery box 300 (also referred to as "box" or "storage container") as a parcel.

In this storage step, the delivery box 300 suitable for the delivery of the parcel is selected from among a plurality of delivery box 300 based on the size, shape, quantity and impact resistance of the parcel, and the item is packaged as the parcel and stored in the delivery box 300.

Next, "vehicle determination step A3" is performed to determine the delivery vehicle 200 to carry the delivery box 300 having stored the parcel in the storage step, and to determine the carrier vehicle 100 to carry the delivery vehicle 200. Here, the delivery vehicle 200 may be referred to as "first vehicle", and the carrier vehicle 100 may be referred to as "second vehicle."

After the vehicles for delivery are determined in the vehicle determination step, "information setting step A4" is performed to set or store predetermined information in the storage device of each of the delivery box 300, the delivery vehicle 200 and the carrier vehicle 100.

In the information setting step, first, the storage device of the delivery box 300 stores at least delivery vehicle identification information (delivery vehicle ID) to identify the delivery vehicle 200 carrying the delivery box 300 thereon, and delivery destination information that designates the delivery destination 20. Second, the storage device of the delivery vehicle 200 stores at least delivery box identification information that identifies the delivery box 300 to be carried on the delivery vehicle 200, authentication information, carrier vehicle identification information (carrier vehicle ID) that identifies the carrier vehicle 100 to carry the delivery vehicle 200 thereon, and delivery destination information that designates the delivery destination 20. Third, the storage device of the carrier vehicle 100 stores the delivery vehicle ID that identifies the delivery vehicle 200 to be carried on the carrier vehicle 100, and the delivery destination information that identifies the delivery destination 20.

After the information is set in the storage device of each of the delivery box 300, the delivery vehicle 200, and the carrier vehicle 100 in the information setting step, "departure preparation step A5" is performed to prepare for departure by carrying the delivery box 300 on the delivery vehicle 200 and carrying the delivery vehicle 200 with the delivery box 300 on the carrier vehicle 100.

After the departure preparation is completed in the departure preparation step, "shipping instruction step A6" is performed to instruct the shipping by issuing "box shipping request" to the carrier vehicle 100.

After the above-described process, the carrier vehicle 100 departs from the center 10 to the delivery destination 20.

Next, "box pick-up process" to pick up the delivery box 300 delivered to the delivery destination 20 will be described.

In the box pick-up process, first "inquiry step B1" is performed to send "inquiry about box pick-up" from the center 10 to a predetermined carrier vehicle 100 after the center 10 receives "reception completion" indicating that the parcel has been taken out of the delivery box 300.

After sending "inquiry about box pick-up" from the center 10 to the predetermined carrier vehicle 100 in the inquiry step B1, "reception step B2" is performed to receive "box inquiry response" indicating that the carrier vehicle 100 carries the delivery vehicle 200 without the delivery box 300 and therefore can pick up the delivery box 300, or that the carrier vehicle 100 carries no delivery vehicle 200 without the delivery box 300 and therefore cannot pick up the delivery box 300, from the carrier vehicle 100 having received the inquiry.

In this case, the carrier vehicle 100 may send "box inquiry response" with information required for the center 10 to determine the carrier vehicle 100 for picking up the delivery box 300, such as the present location, and the number of remaining parcels to be delivered.

Next, after receiving the box inquiry response from each of the carrier vehicles 100, "carrier vehicle determination step B3" is performed to determine the carrier vehicle 100 for picking up the delivery box 300, based on the box inquiry response received from each of the carrier vehicles 100.

In this carrier vehicle determination step B3, the carrier vehicle 100 for picking up the delivery box 300 is determined from among the carrier vehicles 100 carrying the delivery vehicles 200 without the delivery box 300, taking into account the distance or the traveling path to the delivery destination 20 at which the delivery box 300 to be picked up is located.

Next, after determining the carrier vehicle 100 for picking up the delivery box 300 in the carrier vehicle determination step B3, "pick-up instruction step B4" is performed to send "box pick-up instruction" to the determined carrier vehicle 100.

Upon receiving the box pick-up instruction in the pick-up instruction step B4, the carrier vehicle 100 searches the delivery route, as a pick-up route, of the delivery box 300 to pick up the delivery box 300.

The center 10 sends instructions for delivery and pick-up of the delivery box 300 through the above-described processes.

Figure 4:
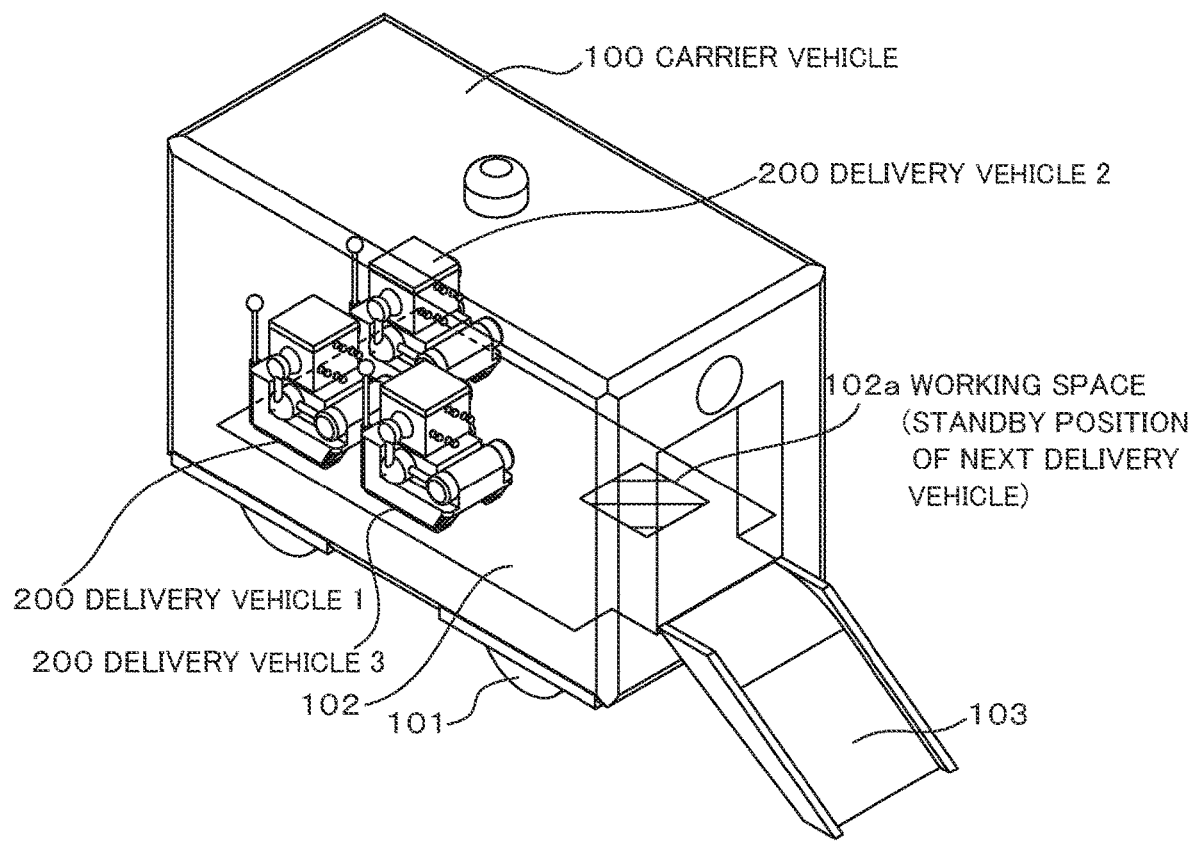
FIG. 4 is a drawing showing the configuration of a carrier vehicle according to an embodiment of the present invention.

FIG. 4 is a drawing showing the configuration of the carrier vehicle 100 according to an embodiment of the present invention.

FIG. 4 shows the carrier vehicle 100 including carrier vehicle drive wheels 101 that travels on the road, a shed surface 102 on which the delivery vehicles 200 are carried, and a door 103 that serves as a gateway for the delivery vehicles 200.

A working space (working surface) 102a for the delivery vehicle 200 is provided in the shed surface 102. This working space 102a serves as a standby position for the delivery vehicle 200 used for the next delivery and also serves as a working area where the delivery box 300 is carried on the delivery vehicle 200 to prepare for the delivery.

The door 103 serves as an entrance pathway and an exit pathway when the delivery vehicle 200 enters and exits the carrier vehicle 100.

Figure 5:
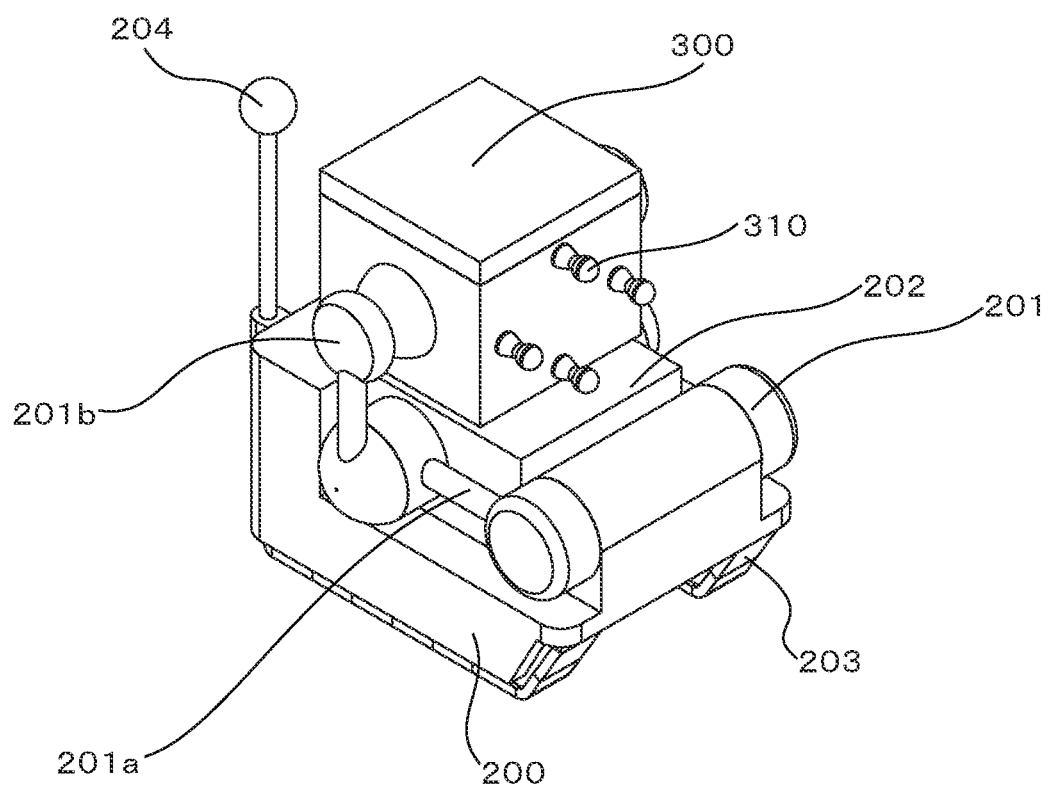
FIG. 5 is a drawing showing the configuration of a delivery vehicle according to an embodiment of the present invention.

FIG. 5 is a drawing showing the configuration of the delivery vehicle 200 according to an embodiment of the present invention.

The delivery vehicle 200 shown in FIG. 5 includes an arm 201, a carrying platform 202, delivery vehicle drive wheels 203, and a communication antenna 204.

This arm 201 is an articulated arm composed of a first articulated arm 201a and a second articulated arm 201b. The first articulated arm 1 and the second articulated arm 201b move in association with one another to hold the delivery box 300 on the carrying platform 202 and fix the delivery box 300 to the delivery box fixture 400.

This arm 201 serves as a member not only for holding the delivery box 300 on the carrying platform 202 as described above, but also for moving the delivery box 300 from the carrying platform 202 to the delivery box fixture 400 to fix the delivery box 300 to the delivery box fixture 400. In this way, the arm 201 realizes "delivery control mechanism (delivery control part) of the delivery vehicle 200.

The arm 201 may be placed in at least a first arm state as an initial state in which the delivery box 300 is not carried on the carrying platform 202; a second arm state in which the delivery box 300 is carried and held on the carrying platform 202; and a third arm state to fix the delivery box 300 to the delivery box fixture 400.

The carrying platform 202 is a flat pedestal so as to contact the bottom surface of the delivery box 300. Even though the delivery vehicle 200 sways, the arm 201 maintains the delivery box 300 held on the carrying platform 202 and contacting the carrying platform 202.

The delivery vehicle drive wheels 203 are a driving mechanism for the movement on the delivery route (second traveling path) and realizes "automated driving control mechanism (automated driving control part)" of the delivery vehicle 200.

The communication antenna 204 is a communication interface to mutually communicate with the carrier vehicle 100 and the center 10 as well as the delivery box 300.

The delivery vehicle 200 has a balance control function that controls the center of gravity of the delivery vehicle 200 and holds the momentum at the center of gravity constant, and therefore it is possible to prevent the delivery vehicle 200 from overturning. In this case, the momentum can be held constant by a mechanism of, for example, feedback control such that reaction of the force applied to the delivery vehicle 200 in the traveling direction, and each of the right, left, upper and lower directions is calculated and the reaction is applied to the delivery vehicle 200.

In addition, the delivery vehicle 200 is equipped with a radar, a sensor such as a laser sensor, an infrared sensor, an ultrasonic sensor, and a pyroelectric sensor, and a camera (not shown). They are used for traveling control on the delivery route, and also used to check the positions of the slots 410 in the delivery box fixture 400.

FIGS. 6 to 9 show delivery modes of the delivery states according to an embodiment of the present invention.

Figure 6:
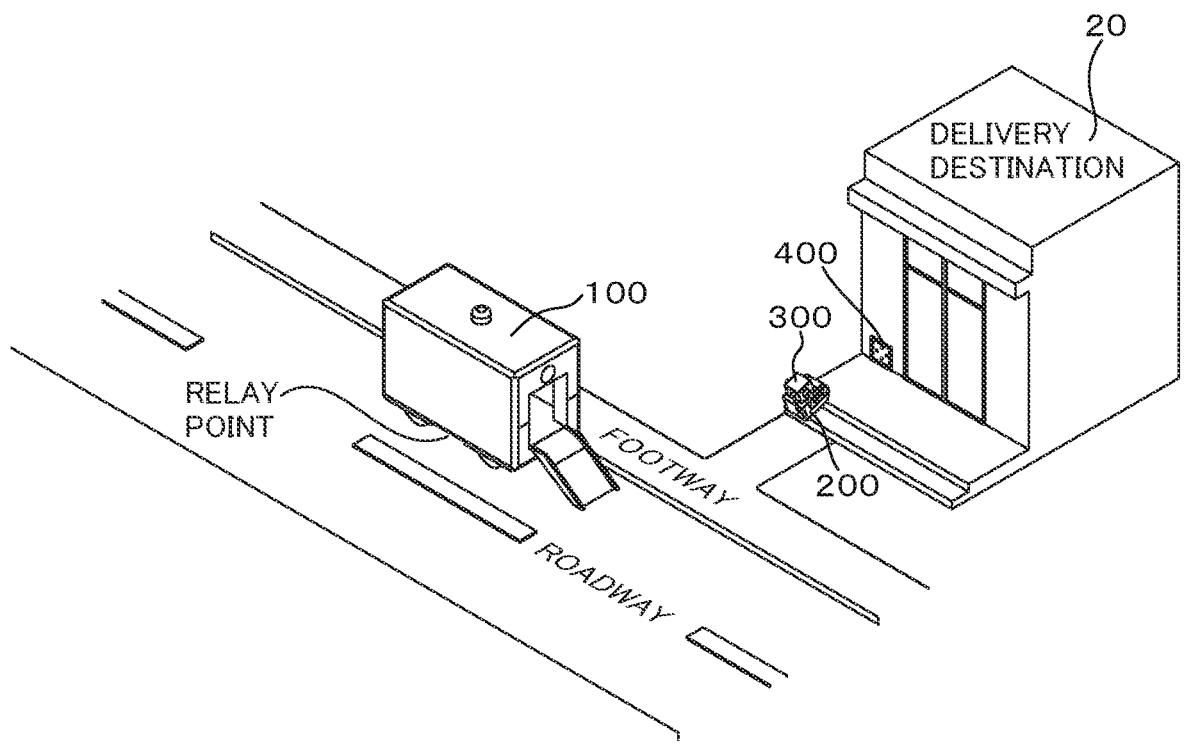
FIG. 6 is a drawing showing a delivery state of the delivery system according to an embodiment of the present invention (1)

FIG. 6 shows a roadway, a footway along the roadway, a delivery destination pathway approximately perpendicular to the footway, steps (stairs) formed from the delivery destination pathway to the delivery box fixture 400 at the delivery destination, a delivery destination designated location 21 (described later) designated for each of the delivery destinations, which is provided beyond the stairs as space where the arm 201 can move to set the delivery box 300 in the delivery box fixture 400, and a delivery box fixture 400 set on a wall surface of the delivery destination 20.

In FIG. 6, the carrier vehicle 100 stops by the side of the roadway at a relay point (e.g., "relay point 1") for the delivery destination 20, and here the delivery vehicle 200 gets out of the carrier vehicle 100 through the door as the exit pathway and travels across the footway to the delivery destination pathway.

After passing through the delivery destination pathway, the delivery vehicle 200 climbs over the stairs and arrives at the delivery destination designated location 21. Then, the delivery vehicle 200 confirms the positions of the slots 410 of the delivery box fixture 400 to fix the delivery box 300 to the delivery box fixture 400, by controlling the arm 210.

Figure 7:
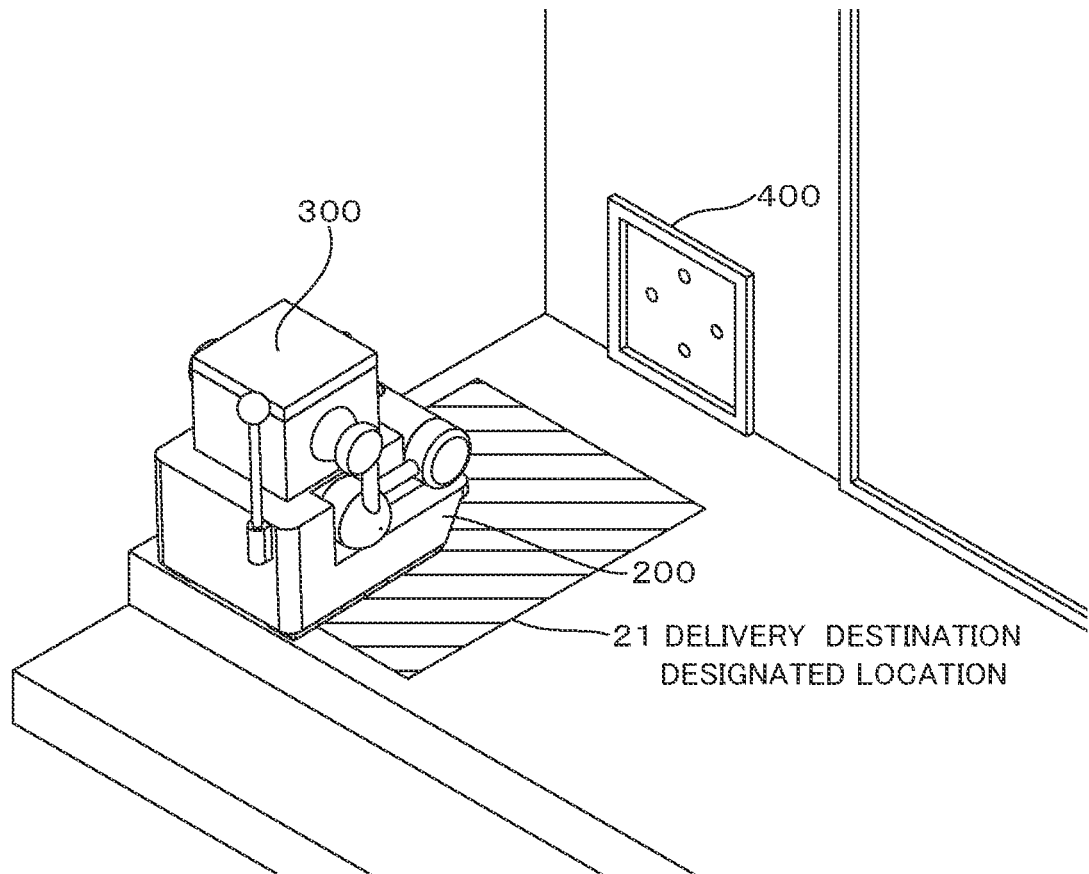
FIG. 7 is a drawing showing a delivery state of the delivery system according to an embodiment of the present invention (2)
Figure 8:
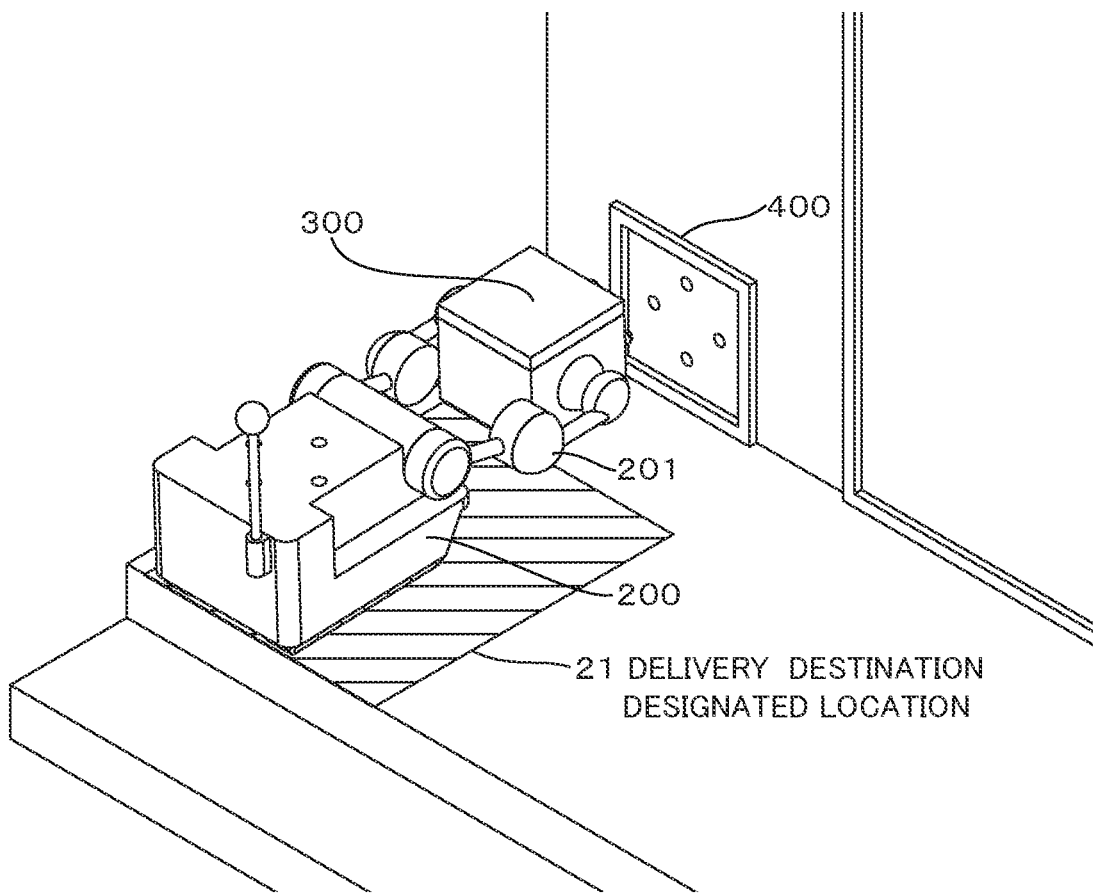
FIG. 8 is a drawing showing a delivery state of the delivery system according to an embodiment of the present invention (3)
Figure 9:
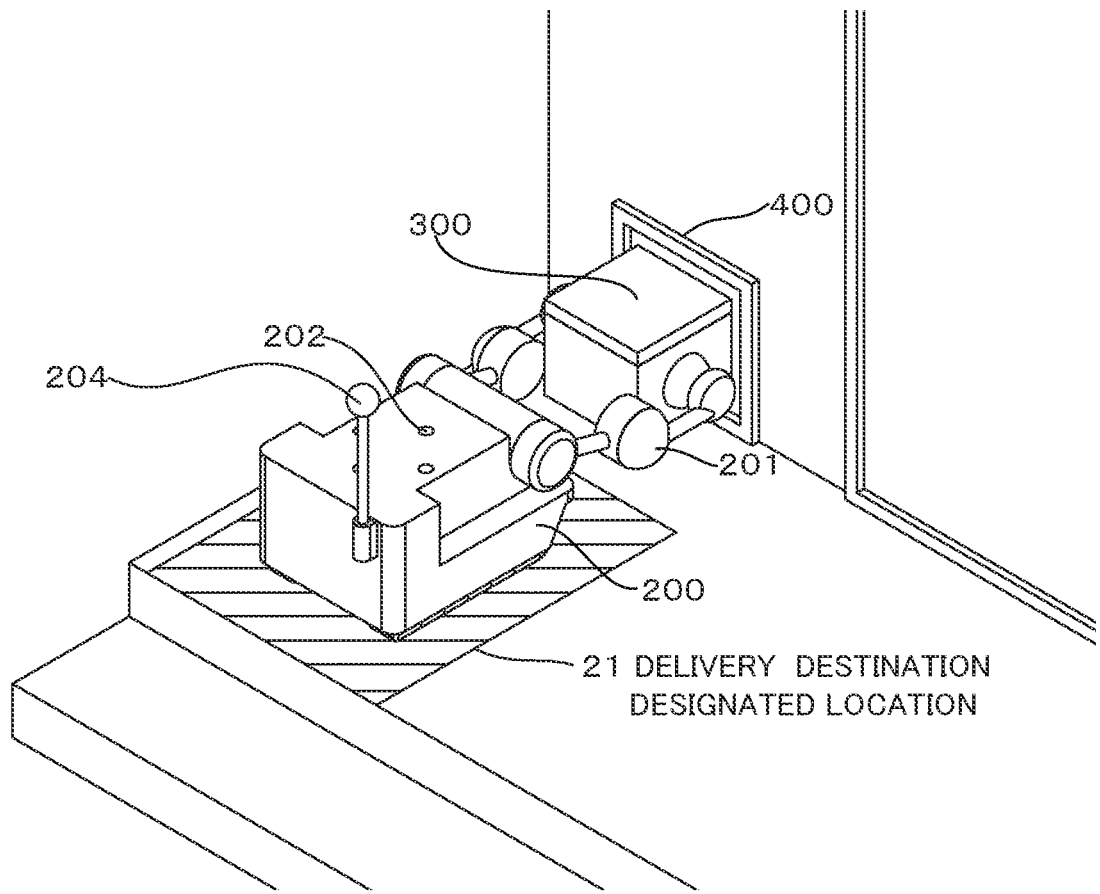
FIG. 9 is a drawing showing a delivery state of the delivery system according to an embodiment of the present invention (4)

FIGS. 7 to 9 show how to fix the delivery box 300 to the delivery box fixture 400 by the movable arm 201 of the delivery vehicle 200 working in the delivery destination designated location 21 in the delivery destination.

This delivery destination designated location 21 is a certain working area located in front of the delivery box fixture 400 where the movable arm 201 of the delivery vehicle 200 works to fix the delivery box 300 to the delivery box fixture 400.

When the delivery vehicle 200 is placed in the delivery destination designated location 21 as shown in FIG. 7, the delivery vehicle 200 confirms or detects the positions of the slots 410 of the delivery box fixture 400.

Next, as shown in FIG. 8, the movable arm 201 of the delivery vehicle 200 lifts up the delivery box 300 from the carrying platform 202 and moves the delivery box 300 to a position in front of the delivery vehicle 200.

Then, the delivery vehicle 200 inserts the protrusions 310 of the delivery box 300 into or through the slots 410 in the confirmed (detected) positions, so that the delivery box 300 is locked as shown in FIG. 9.

The delivery box fixture 400 shown in FIGS. 7 to 9 has four slots 410 (a first slot 410a, a second slot 410b, a third slot 410c and fourth slot 410d). Correspondingly, the delivery box 300 has four protrusions 310 (a first protrusion 1, a second protrusion 2, a third protrusion 3, and fourth protrusion 4) which are inserted into those four slots 410, respectively.

Another configuration naturally is possible where the delivery box fixture 400 has a plurality of slots 410 while the delivery box 300 has only one protrusion 310, and vice versa. In addition, when the protrusions 310 are formed as protruding mechanisms that can be embedded or compressed in the delivery box 300 by spring, the number of the slots 410 may be equal to or smaller than that of the protrusions 310.

That is, the numbers of the engagement portions (protrusions 310 and slots 410) may not necessarily be the same between the delivery box 300 and the delivery box fixture 400.

Figure 10:
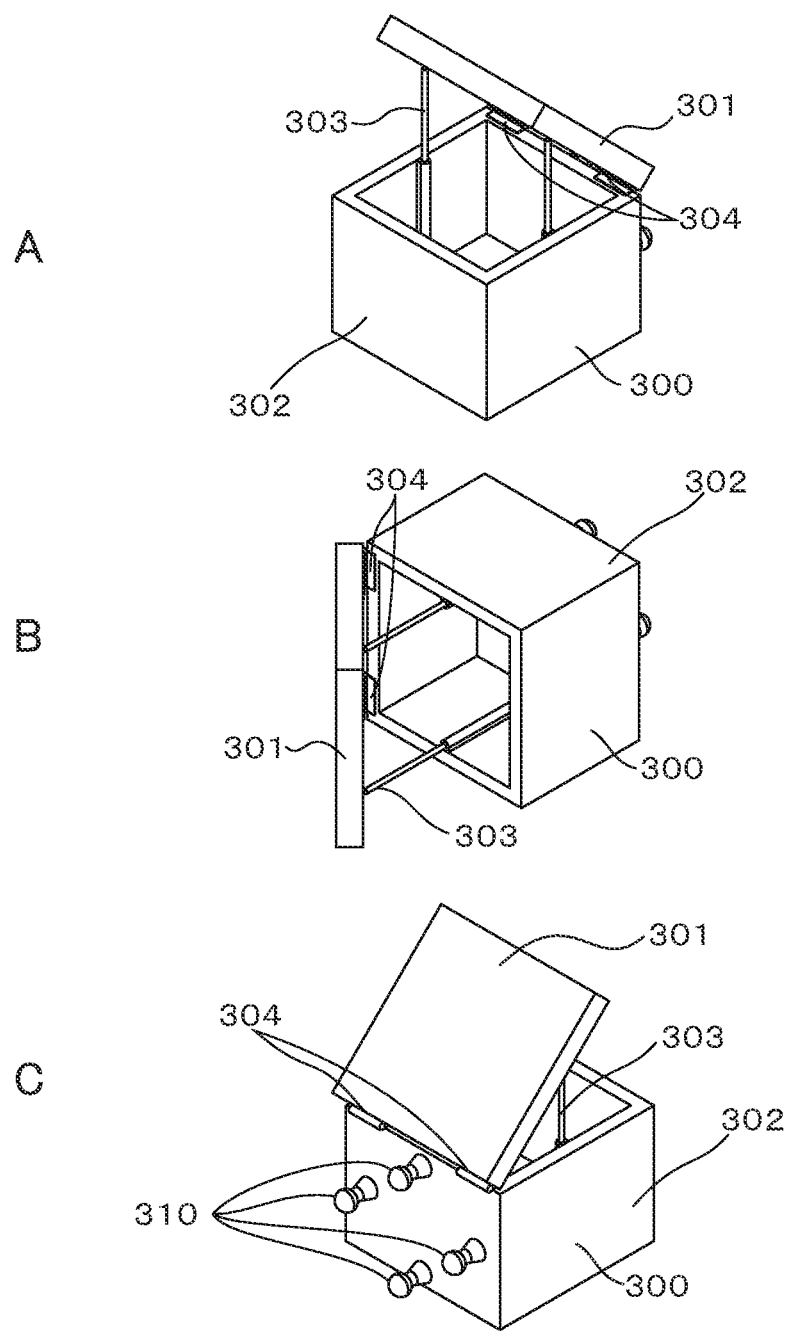
FIG. 10 is a drawing showing details of the configuration of a delivery box according to an embodiment of the present invention.

FIG. 10 is a drawing showing details of the configuration of the delivery box 300 according to an embodiment of the present invention.

In FIG. 10, the delivery box 300 includes a lid 301, a parcel storage part 302, a damper 303 and hinges 304. The lid 301 is coupled to the parcel storage part 302 by the hinges 304.

The lid 301 opens with respect to the hinges 304 as pivot points, and the damper 303 can maintain the open state and slowly close the lid 301.

In FIG. 10, A shows a state in which the lid 301 can open and close in the vertical direction, and B shows a state in which the lid 301 can open and close in the front-to-back direction. The delivery box 300 is selected depending on a parcel to be delivered.

In FIG. 10, C is obtained by turning the delivery box 300 shown as A, and shows the back side of the delivery box 300 having the protrusions 310. These protrusions 310 are provided at positions corresponding to the slots 410 of the delivery box fixture 400 as described later.

The protrusions 310 may be referred to as engagement portions (first engagement portions) that engage with the slots 410 of the delivery box fixture 410.

Figure 11:
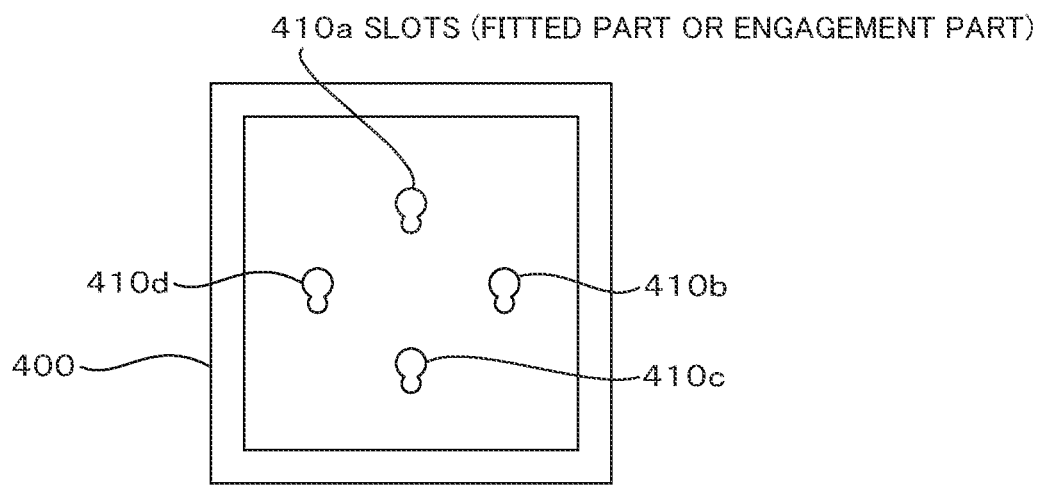
FIG. 11 is a drawing showing details of the configuration of a delivery box fixture according to an embodiment of the present invention.

FIG. 11 is a drawing showing details of the delivery box fixture 400 according to an embodiment of the present invention.

The delivery box fixture 400 shown in FIG. 11 includes four slots 410 (the first slot 410a, the second slots 410b, the third slot 410c, and the fourth slot 410d) which can engage with the protrusions 310 of the delivery box 300.

Therefore, the slots 410 may be referred to as engagement portions (second engagement portions) that engage with the slots 310 of the delivery box 300.

Each of the slots 410 is composed of two circular parts, an upper circular part 410a and a lower circular part 410b. Each of the protrusions 310 of the delivery box 300 engages with or fits in two circular parts, the upper circular part 410a and the lower circular part 410b. Here, the protrusion 310 has a cylindrical part protruding from the delivery box 300. The cylindrical part prevents the delivery box 300 from being lifted up to fix the delivery box 300.

Figure 12:
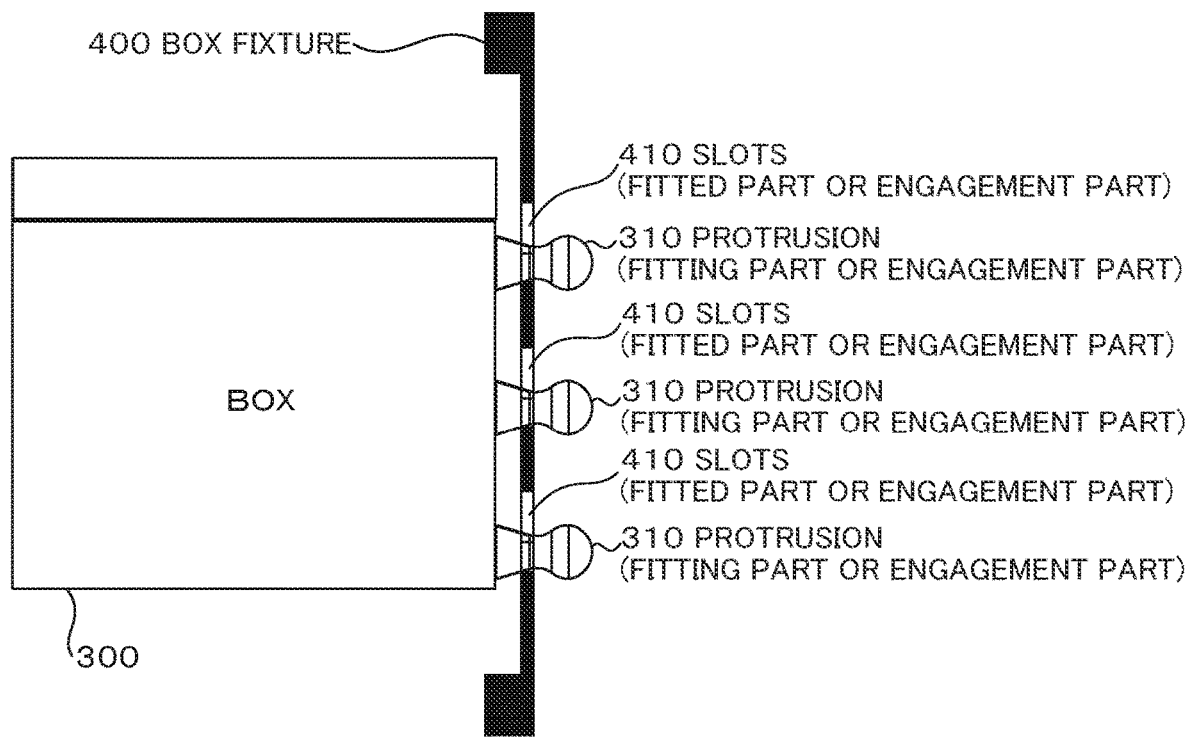
FIG. 12 is a drawing showing a state in which the delivery box engages with the delivery box fixture according to an embodiment of the present invention.

FIG. 12 is a drawing showing a state in which the delivery box 300 engages with the delivery box fixture 400 according to an embodiment of the present invention.

In FIG. 12, the protrusions 310 of the delivery box 300 are inserted into or mated with the slots 410 of the delivery box fixture 400, so that the delivery box 300 engages with and is fixed to the delivery box fixture 400.

Each of the slots 410 of the delivery box fixture 400 is composed of a first slot and a second slot smaller than the first slot.

The protrusion 310 of the delivery box 300 is inserted into the first large slot, and then shifted to the second small slot, so that the delivery box 300 engages with and is fixed to the delivery box fixture 400.

FIG. 13 shows contents of an e-mail sent to the recipient of a parcel.

FIG. 13 shows the contents of an e-mail, as a means of communication, sent from the delivery vehicle 200 to the recipient of the delivery box 300.

This e-mail includes: header information such as an address of a receiver, a sender and a subject; the text of a message; a box number as delivery box identification information to identify the delivery box; and an unlocking key code.

Upon receiving the e-mail with the above-described contents, the recipient of the delivery can recognize the completion of the delivery, identify the delivery box 300, unlock the identified delivery box 300 and take the parcel out of the delivery box 300.

Figure 14:
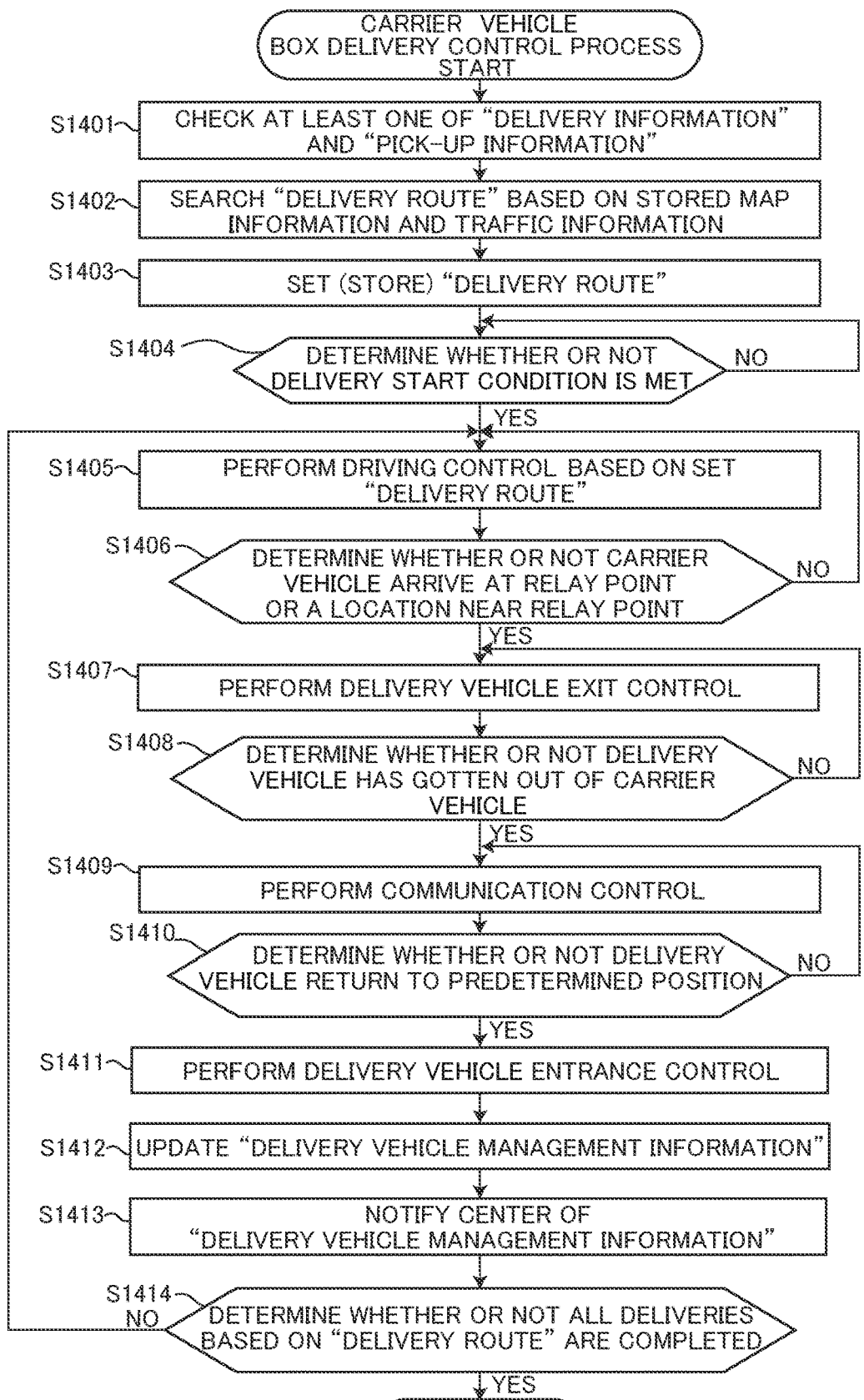
FIG. 14 is a flowchart showing details of a box delivery control process performed in the carrier vehicle according to an embodiment of the present invention.

FIG. 14 is a flowchart showing details of a box delivery control process performed by the carrier vehicle 100 according to an embodiment of the present invention.

In FIG. 14, the carrier vehicle 100 confirms at least one of "delivery information" and "pick-up information" which are set information, or received information by communicating with the center 10 (S1401).

This delivery information includes "fixture number" to identify the delivery box fixture 400, and "box identification information" to identify the delivery box 300 to be delivered, as well as the address and name of the delivery destination 20. Meanwhile, the pick-up information includes "fixture number" to identify the delivery box fixture 400 and "box identification information" to identify the delivery box 300 to be picked up, as well as the address and name of the pick-up destination.

Based on the delivery information and the pick-up information, as well as the map information and traffic information stored in advance, the carrier vehicle 100 searches the delivery route to the delivery destination (S1402), and sets or stores the searched delivery route (S1403).

Then, the carrier vehicle 100 determines whether or not a shipping condition to depart from the present location such as the center 10 and start delivery is met (S1404). This shipping condition is met when the turn of the carrier vehicle 100 comes for departure from the center 10, or the set time for departure comes.

Until determining that the shipping condition is met (S1404: NO), the carrier vehicle 100 continues to stand by. On the other hand, when determining that the shipping condition is met (S1404: YES), the carrier vehicle 100 performs driving control for the delivery based on the set delivery route (S1405).

In this driving control, the carrier vehicle 100 travels on the delivery route from the present location to the delivery destination 20 by using the GPS device and various information such as the map information, the road information and the traffic information. In addition, the carrier vehicle 100 travels, watching other cars around itself, pedestrians, animals, a falling object, grooves, bumps, driving lanes defined by center lines, and traffic lights, based on information obtained by a radar, a sensor, such as a laser sensor, an infrared sensor, a ultrasonic sensor, and a pyroelectric sensor, and in addition, a facial recognition system with a camera, and a human body detection system.

Then, in the driving control, the carrier vehicle 100 determines whether or not the carrier vehicle 100 arrives at a relay point for the delivery destination 20 on the delivery route indicated by the delivery information, or a location near the relay point (S1406).

Until arriving at the relay point or the location near the relay point, the carrier vehicle 100 continues to perform the driving control (S1406: NO). Then, upon arriving at the relay point for the delivery destination 20 indicated by the delivery information or a location near the relay point (S1406: YES), the carrier vehicle 100 performs exit control to get the delivery vehicle 200 out of the carrier vehicle 100 to deliver the delivery box 300 from the relay point to the delivery destination 20 (S1407).

The carrier vehicle 100 determines whether or not the delivery vehicle 200 has gotten out of the carrier vehicle 100 in the exit control (S1408). Until the delivery vehicle 200 has gotten out of the carrier vehicle 100 (S1408: NO), the carrier vehicle 100 continues to perform the exit control (S1407).

Then, when the exit control is completed, that is, the carrier vehicle 200 has gotten out of the carrier vehicle 100 (S1408: YES), the carrier vehicle 100 performs communication control to continuously communicate with the delivery vehicle 200 having gotten out of the carrier vehicle 100 to continuously manage the delivery state of the delivery vehicle 200 (S1409).

By this means, the carrier vehicle 100 and the delivery vehicle 200 can know each other's present locations and delivery states point by point.

Then, the carrier vehicle 100 determines whether or not the delivery vehicle 200 completes the delivery and returns to a predetermined position (S1410). That is, after the delivery vehicle 200 fixes the delivery box 300 to the delivery box fixture 400 at the delivery destination 20 to complete the delivery, the carrier vehicle 100 determines whether or not the delivery vehicle 200 returns to the predetermined position which is designated in association with the carrier vehicle 100 to enter the carrier vehicle 100.

Until the delivery vehicle 200 returns to the predetermined position (S1410: NO), the carrier vehicle 100 performs the communication control to continuously manage the situation of the delivery vehicle 200 (S1409).

The carrier vehicle 100 may perform the communication control to directly communicate with the delivery vehicle 200, or indirectly communicate with the delivery vehicle 200. In addition, all the control processes of the carrier vehicle 100 and the delivery vehicle 200 may be performed according to instructions from the center 10 in communication with the carrier vehicle 100 and the delivery vehicle 200.

On the other hand, when the delivery vehicle 200 returns to the predetermined position (S1410: YES), the carrier vehicle 100 performs entrance control to let the delivery vehicle 200 into the carrier vehicle (S1411). In this entrance control, the door of the carrier vehicle 100 opens and serves as the entrance pathway through which the delivery vehicle 200 enters the carrier vehicle 100, and the delivery vehicle 200 stops at a predetermined stop position in the carrier vehicle 100.

When the delivery vehicle 200 has entered the carrier vehicle 100 in the entrance control, the carrier vehicle 100 notifies the center 10 of the management information of the delivery vehicle 200 (S1413). By this means, the center 10 can recognize that the delivery vehicle 200 has returned to the carrier vehicle 100. In this case, in the same way as described above, the carrier vehicle 100 may perform the communication control to directly communicate with the delivery vehicle 200, or indirectly communicate with the delivery vehicle 200 via the center. Also, all the control processes of the carrier vehicle 100 and the delivery vehicle 200 may be performed according to instructions from the center 10 in communication with the carrier vehicle 100 and the delivery vehicle 200.

Then, the carrier vehicle 100 determines whether or not all the deliveries on the delivery route are completed (S1414). When determining that all the deliveries are completed (S1414: YES), the carrier vehicle 100 ends the process.

On the other hand, until the carrier vehicle 100 determines that all the delivery boxes 300 have been delivered (S1404: NO), the carrier vehicle 100 performs the driving control for the delivery of the delivery box 300 on the set delivery route (S1405).

Figure 15:
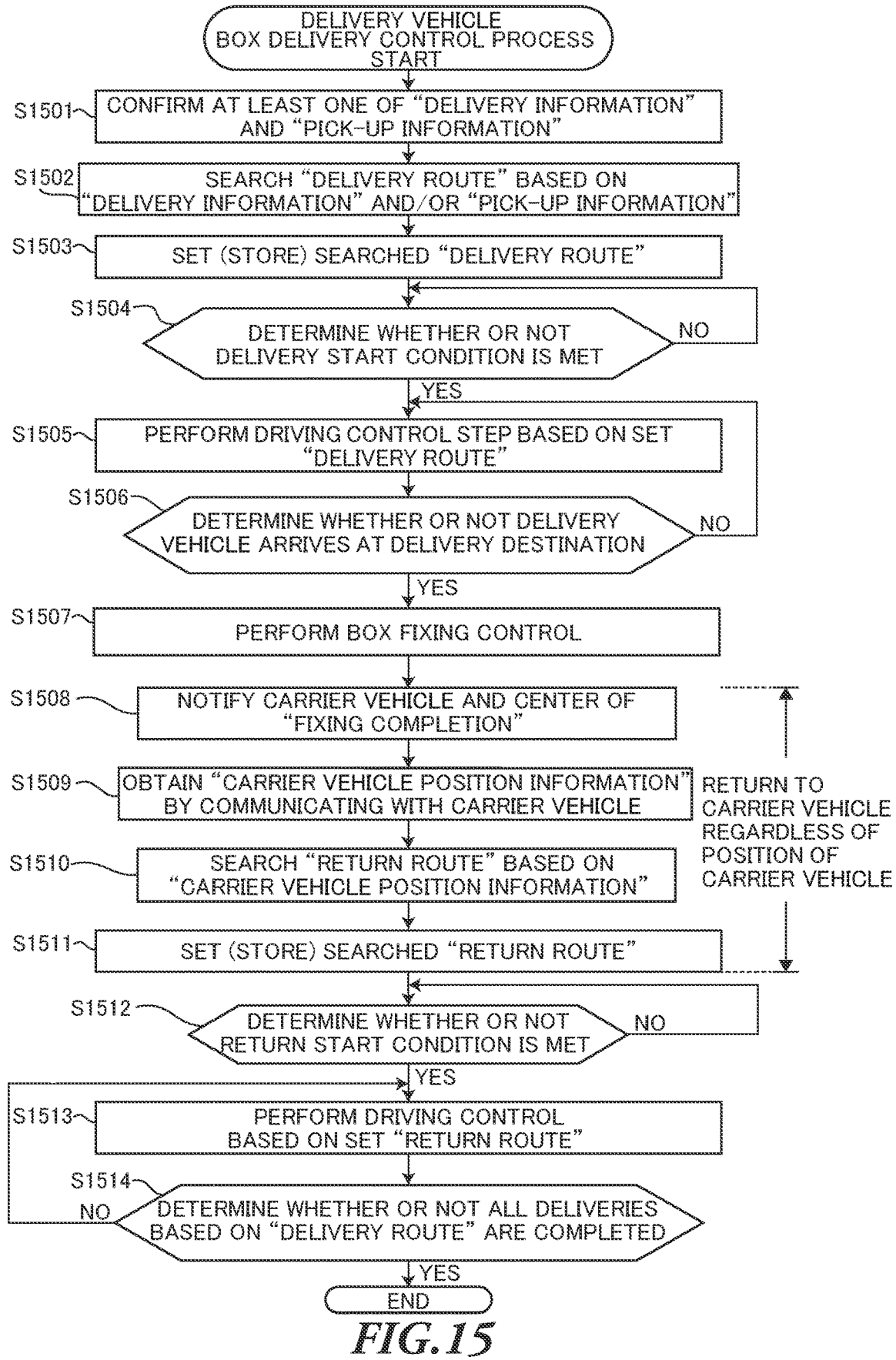
FIG. 15 is a flowchart showing details of a box delivery control process performed in the delivery vehicle according to an embodiment of the present invention.

FIG. 15 is a flowchart showing details of a box delivery control process performed by the delivery vehicle 200 according to an embodiment of the present invention.

In FIG. 15, the delivery vehicle 200 checks at least one of "delivery information" and "pick-up information" which are set information, or received information by communicating with the center 10 (S1501).

Like the carrier vehicle 100, the delivery information includes "fixture number" to identify the delivery box fixture 400, and "box identification information" to identify the delivery box 300 to be delivered, as well as the address and name of the delivery destination 20. Meanwhile, like the carrier vehicle 100, the pick-up information includes "fixture number" to identify the delivery box fixture 400 and "box identification information" to identify the delivery box 300 to be picked up, as well as the address and name of the pick-up destination.

Based on the delivery information and the pick-up information, as well as the map information and traffic information stored in advance, the delivery vehicle 200 searches the delivery route to the delivery destination 20 (S1502), and sets or stores the searched delivery route (S1503).

Then, the delivery vehicle 200 determines whether or not a delivery vehicle start condition to depart from the present location such as a relay point and start delivery is met (S1504). This delivery vehicle start condition is met when the door of the carrier vehicle 100 opens and the delivery vehicle 200 can get out of the carrier vehicle 100 in view of, for example, surrounding road conditions.

Until determining that the delivery vehicle start condition is met (S1504: NO), the delivery vehicle 200 continues to stand by. On the other hand, when determining that the delivery vehicle start condition is met (S1504: YES), the delivery vehicle 200 performs driving control for the delivery to the delivery destination 20 based on the set delivery route (S1505).

Then, in this driving control, the delivery vehicle 200 determines whether or not the delivery vehicle 200 arrives at the delivery destination 20 on the delivery route indicated by the delivery information (S1506).

Until arriving at the delivery destination 20, the delivery vehicle 200 continues to perform the driving control (S1506: NO). Then, upon arriving at the delivery destination 20 indicated by the delivery information (S1506: YES), the delivery vehicle 200 performs box fixing control to engage the delivery box 300 carried thereon with the delivery box fixture 400 located at the delivery destination 20 to fix the delivery box 300 to the delivery box fixture 400 (S1507).

After fixing the delivery box 300 to the delivery box fixture 400 in this box fixing control, the delivery vehicle 200 notifies the carrier vehicle 100 and the center 10 of "fixing completion" (S1508).

Then, the delivery vehicle 200 obtains "carrier vehicle position information" by communicating with the carrier vehicle 100 (S1509). The delivery vehicle 200 searches "return route" to the carrier vehicle 100 based on the carrier vehicle position information obtained (S1510) and sets or stores the searched route (S1511).

In this state, the delivery vehicle 200 determines whether or not "return start condition" to start driving control based on the set return route is met (S1512).

Until determining that the return start condition is met (S1512: NO), the delivery vehicle 200 continues to stand by. On the other hand, when determining that the return start condition to start driving control is met (S1512: YES), the delivery vehicle 200 performs the driving control based on the set return route (S1513).

Then, the delivery vehicle 200 determines whether or not all the deliveries are completed based on the set delivery route (S1514). Until determining that all the deliveries are completed (S1514: NO), the delivery vehicle 200 continues to perform the driving control based on the return route (S1513). On the other hand, when determining that all the deliveries are completed, the delivery vehicle 200 ends the box delivery control process.

Figure 16:
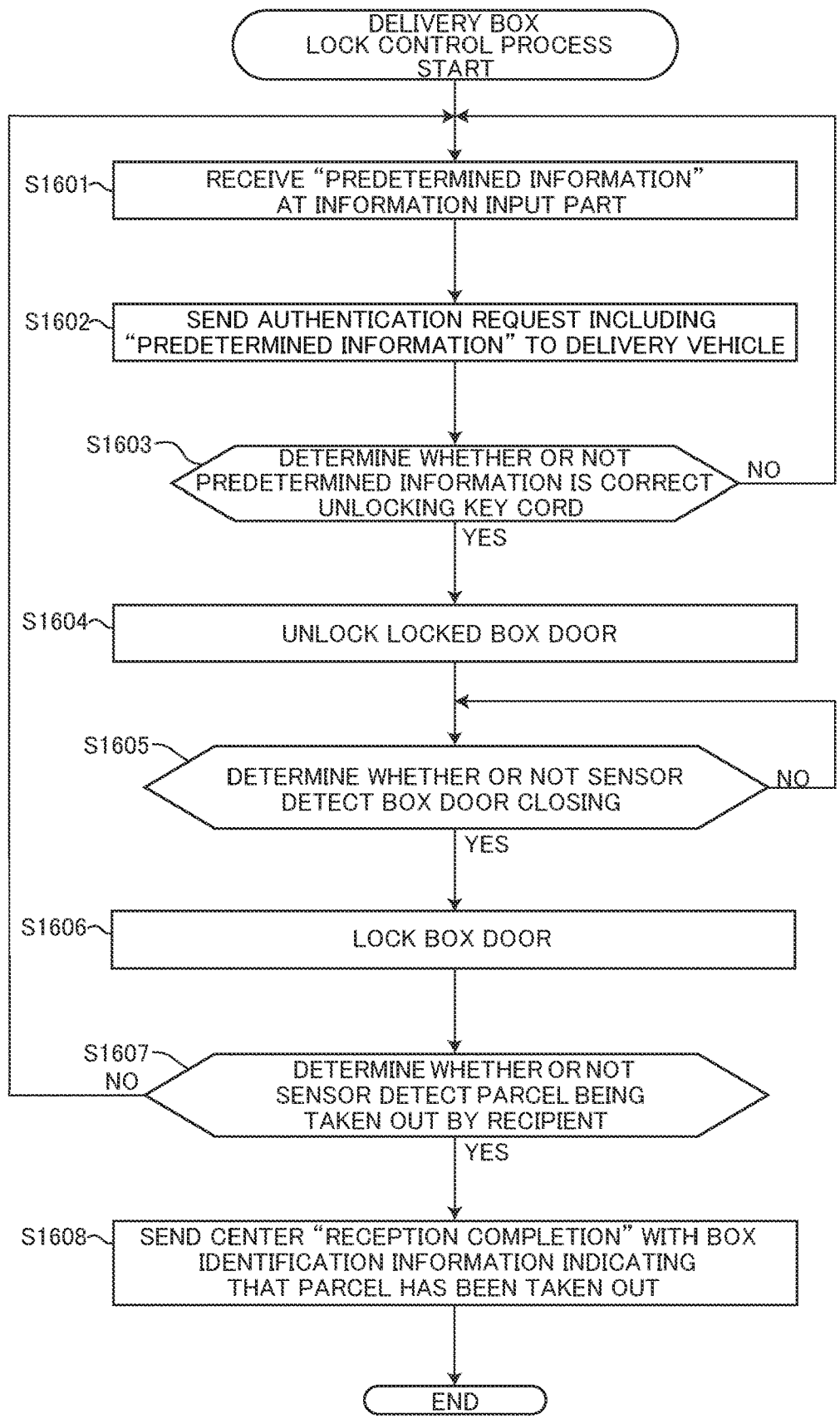
FIG. 16 is a flowchart showing details of an unlock control process in the delivery box according to an embodiment of the present invention.

FIG. 16 is a flowchart showing details of a lock control process performed by the delivery box 300 according to an embodiment of the present invention.

In FIG. 16, an information input part provided in the delivery box 300 receives "predetermined information" inputted from, for example, the recipient of the parcel stored in the delivery box 300 (S1601). This information input part of the delivery box 300 may be, for example, a touch panel, a button, and a camera (imaging device).

The delivery box 300 sends the delivery vehicle 200 an authentication request including the predetermined information inputted from the information input part (S1602). Upon receiving the authentication request including the predetermined information from the delivery box 300, the delivery vehicle 200 determines whether or not the predetermined information is a correct "unlocking key code" to unlock the delivery box 300.

This authentication request may include information to identify the delivery box 300, as well as the predetermined information. The delivery vehicle 200 determines whether or not the predetermined information is the unlocking key code corresponding to the authentication information designated to the information to identify the delivery box 300, and responds to the delivery box 300. That is, the delivery vehicle 200 may store the authentication information designated to the information to identify the delivery box 300, and a determination program to determine whether or not the predetermined information is the unlocking key code corresponding to the authentication information.

Then, the delivery box 300 determines whether or not the response from the delivery vehicle 200 indicates that the predetermined information is authenticated as the unlocking key code (S1603). When the delivery vehicle 200 determines that the predetermined information is authenticated as the correct unlocking key code, the delivery box 300 performs unlocking to unlock the locked door (S1604).

By this means, the recipient of the parcel can open the door to take the parcel out of the delivery box 300. After the parcel is taken out by the recipient, the delivery box 300 determines whether or not the sensor detects the door closing (S1605).

Until determining that the sensor detects the door closing (S1605: NO), the delivery box 300 stands by. Then, when determining that the sensor detects the door closing (S1605: YES), the delivery box 300 locks the door (S1606).

In this case, the door cannot be unlocked unless the recipient inputs the unlocking key code. Here, if the recipient inputs the correct unlocking key code, it is possible to open the door.

After the door is locked, the delivery box 300 determines whether or not the sensor such as a parcel detecting sensor provided in the delivery box 300 has detected the parcel being taken out by the recipient (S1607).

When determining that the sensor has detected the parcel being taken out by the recipient (S1607: YES), the delivery box 300 sends the center 10 "reception completion" with the box identification information indicating that the parcel has been taken out (S1608).

Until determining that the sensor has detected the parcel being taken out by the recipient (S1607: NO), that is, when the parcel has not been taken out, the delivery box 300 allows the information input part to receive the predetermined information.

Although a configuration has been shown where it is determined whether or not the parcel is taken out by the recipient after the door is locked, it is by no means limiting. Another configuration is possible where the delivery box 300 sends the center 10 "reception completion" with the box identification information indicating that the parcel has been taken out, based on the fact that the parcel detecting sensor detects the parcel being taken out by the recipient from the open door and then the door is locked.

The above-described embodiment is merely an example of the present invention and is not intended to limit the scope of the invention. Moreover, the embodiment may be appropriately modified or altered without changing the gist of the invention.

REFERENCE SIGNS LIST 10 center
20 delivery destination
100 carrier vehicle
101 carrier vehicle drive wheel
102 shed surface
102a working space
103 door
200 delivery vehicle
201 arm
201a first articulated arm
201b second articulated arm
202 carrying platform
203 delivery vehicle drive wheel
204 communication antenna
300 delivery box
310 protrusion
400 delivery box fixture
410 slot

The invention claimed is:

1. A delivery system comprising:
a delivery vehicle configured to carry a delivery box to be delivered to a delivery destination thereon; and
a carrier vehicle configured to carry the delivery vehicle thereon, wherein:
the carrier vehicle performs exit control to get the delivery vehicle carrying the delivery box to be delivered to the delivery destination out of the carrier vehicle at a relay point on a traveling route to the delivery destination;
the delivery vehicle performs traveling control on the traveling route from the relay point to the delivery destination, and engages the delivery box with a delivery box fixture located at the delivery destination so that the delivery box is fixed to the delivery box fixture to prevent the delivery box from being removed from the delivery box fixture;
the delivery box includes at least one protrusion configured to be able to engage with the delivery box fixture;
the delivery vehicle includes a sensor configured to detect at least one slot of the delivery box fixture which corresponds to the at least one protrusion; and
the at least one slot detected by the sensor engages with the at least one protrusion of the delivery box to fix the delivery box to the delivery box fixture.

2. The delivery system according to claim 1, wherein the delivery vehicle is configured:
to store map information containing the delivery destination;
to search the traveling route of the delivery vehicle by using the map information; and
to perform the traveling control based on the searched traveling route.

3. The delivery system according to claim 2, wherein:
the delivery vehicle searches the traveling route from the relay point to the delivery destination by using the map information; and
the delivery vehicle performs the traveling control from the relay point to the delivery destination, based on the searched traveling route to the delivery destination.

4. The delivery system according to claim 2, wherein:
the delivery vehicle searches the traveling route from the delivery destination to a return point designated by communicating with the carrier vehicle, after fixing the delivery box to the delivery box fixture; and
the delivery vehicle performs the traveling control from the delivery destination to the return point, based on the searched traveling route to the return point.

5. A delivery system for delivering a delivery box to a delivery destination, comprising:
a delivery vehicle configured to carry the delivery box to be delivered to the delivery destination thereon; and
a carrier vehicle configured to carry the delivery vehicle thereon, wherein:
a delivery box fixture configured to be able to fix the delivery box is located at the delivery destination;
the delivery box is carried on the delivery vehicle at a predetermined position;
the delivery vehicle includes an arm configured to move the delivery box from the predetermined position to the delivery box fixture;
the delivery vehicle engages the delivery box to the delivery box fixture located at the delivery destination by using the arm so that the delivery box is fixed to the delivery box fixture to prevent the delivery box from being removed from the delivery box fixture, after the delivery vehicle gets out of the carrier vehicle and travels to the delivery destination;

the delivery box includes at least one protrusion configured to be able to engage with the delivery box fixture;
the delivery vehicle includes a sensor configured to detect at least one slot of the delivery box fixture which corresponds to the at least one protrusion; and
the at least one slot detected by the sensor engages with the at least one protrusion of the delivery box to fix the delivery box to the delivery box fixture.

* * * * *